(12) United States Patent
Ramasubramonian et al.

(10) Patent No.: US 10,284,842 B2
(45) Date of Patent: May 7, 2019

(54) INTER-LAYER REFERENCE PICTURE CONSTRUCTION FOR SPATIAL SCALABILITY WITH DIFFERENT ASPECT RATIOS

(71) Applicant: QUALCOMM Incorporated, San Diego, CA (US)

(72) Inventors: Adarsh Krishnan Ramasubramonian, San Diego, CA (US); Ying Chen, San Diego, CA (US); Xiang Li, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 14/194,159

(22) Filed: Feb. 28, 2014

(65) Prior Publication Data

US 2014/0254679 A1 Sep. 11, 2014

Related U.S. Application Data

(60) Provisional application No. 61/773,102, filed on Mar. 5, 2013.

(51) Int. Cl.
*H04N 19/105* (2014.01)
*H04N 19/597* (2014.01)
(Continued)

(52) U.S. Cl.
CPC ......... *H04N 19/105* (2014.11); *H04N 19/167* (2014.11); *H04N 19/187* (2014.11);
(Continued)

(58) Field of Classification Search
CPC .. H04N 19/105; H04N 19/167; H04N 19/187; H04N 19/30; H04N 19/39; H04N 19/513; H04N 19/577; H04N 19/597
(Continued)

(56) References Cited

U.S. PATENT DOCUMENTS 8,548,056 B2 10/2013 Sagetong et al.
8,761,252 B2 * 6/2014 Park .................... H04N 19/105
375/240.12
(Continued)

FOREIGN PATENT DOCUMENTS

CN 101658038 A 2/2010
FR 2876861 A1 4/2006
(Continued)

OTHER PUBLICATIONS

Francois E., et al., "Extended Spatial scalability: A generalization of spatial scalability for SVC extension of AVC/H.264," 25. Picture coding symposium; Apr. 24, 2006-Apr. 26, 2006; Beijing, Apr. 26, 2006 (Apr. 24, 2006), 6 pages, XP030080338.
(Continued)

*Primary Examiner* — William C Vaughan, Jr.
*Assistant Examiner* — Jae N Noh
(74) *Attorney, Agent, or Firm* — Shumaker & Sieffert, P.A.

(57) ABSTRACT

A method of coding video data includes upsampling at least a portion of a reference layer picture to an upsampled picture having an upsampled picture size. The upsampled picture size has a horizontal upsampled picture size and a vertical upsampled picture size. At least one of the horizontal or vertical upsampled picture sizes may be different than a horizontal picture size or vertical picture size, respectively, of an enhancement layer picture. In addition, position information associated with the upsampled picture may be signaled. An inter-layer reference picture may be generated based on the upsampled picture and the position information.

26 Claims, 11 Drawing Sheets

(51) Int. Cl.
*H04N 19/30* (2014.01)
*H04N 19/513* (2014.01)
*H04N 19/187* (2014.01)
*H04N 19/39* (2014.01)
*H04N 19/167* (2014.01)
*H04N 19/577* (2014.01)

(52) U.S. Cl.
CPC ............. *H04N 19/30* (2014.11); *H04N 19/39* (2014.11); *H04N 19/513* (2014.11); *H04N 19/577* (2014.11); *H04N 19/597* (2014.11)

(58) Field of Classification Search
USPC ...................................................... 375/240.15
See application file for complete search history.

(56) References Cited

U.S. PATENT DOCUMENTS

| 9,225,961 | B2 | 12/2015 | Chen et al. | |
|---|---|---|---|---|
| 2004/0196901 | A1 | 10/2004 | Demos | |
| 2008/0165848 | A1* | 7/2008 | Ye | H04N 19/105 375/240.13 |
| 2009/0028245 | A1* | 1/2009 | Vieron | H04N 19/105 375/240.16 |
| 2015/0229967 | A1* | 8/2015 | Lee | H04N 19/30 375/240.02 |

FOREIGN PATENT DOCUMENTS

| JP | 2008536438 A | 9/2008 |
|---|---|---|
| JP | 2008538057 A | 10/2008 |
| JP | 2009538084 A | 10/2009 |
| JP | 2011223319 A | 11/2011 |
| WO | WO-2001077871 A1 | 10/2001 |
| WO | WO-2006059021 A1 | 6/2006 |
| WO | 2008060125 A1 | 5/2008 |
| WO | 2008086324 A1 | 7/2008 |
| WO | 2009132896 A1 | 11/2009 |
| WO | WO-2011143599 A1 | 11/2011 |

OTHER PUBLICATIONS

International Search Report and Written Opinion—PCT/US2014/019958—ISA/EPO—Aug. 19, 2014.

Liu Y., et al., "Aspect ratio scalability based on SHM-2.0", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-N0283, Jul. 21, 2013 (Jul. 21, 2013), pp. 1-7, XP030114819.

Partial International Search Report—PCT/US2014/019958—ISA/EPO—May 28, 2014.

Ye Y., et al., "CE2: Improved residual upsampling for ESS", 23. JVT Meeting; 80. MPEG Meeting; Apr. 21, 2007-Apr. 27, 2007; San Josa CR ,US; (Joint Video Team of ISO/IEC JTC1/SC29/WG11 and ITU-T SG.16), No. JVT-W117, Apr. 24, 2007 (Apr. 24, 2007), pp. 1-14, XP030007077.

Boyce J., et al., "Legacy base layer codec support in SHVC", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-L0178, Jan. 7, 2013 (Jan. 7, 2013), 3 Pages, XP030113666.

Francois E., et al., "Spatial Scalable Coding Using Cropped Areas", Joint Video Team (JVT) of ISO/IEC MPEG & ITU-T VCEG (ISO/IEC JTC1/SC29/WG11 and ITU-T SG16 Q.6) 13th Meeting: Palma de Mallorca, Apr. 2005, JVT-O040, pp. 1-17.

Kwon D-K., et al., "Reference-Layer Cropping Offsets Signaling in SHVC", Joint Collaborative Team on Video Coding (JCT-VC) of ITU-T SG 16 WP 3 and ISO/IEC JTC 1/SC 29/WG 11, 13th Meeting: Incheon, KR, Apr. 2013, JCTVC-M0219, pp. 1-6.

Ramasubramonian A. K., et al., "Signaling of extended spatial scalability for SHVC", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16);URL: http://wftp3.itu.int/av-arch/jctvc-site/,, No. JCTVC-M0309, Apr. 9, 2013 (Apr. 9, 2013), XP030114266, 4 pp.

* cited by examiner

INTER-LAYER REFERENCE PICTURE CONSTRUCTION FOR SPATIAL SCALABILITY WITH DIFFERENT ASPECT RATIOS

CROSS REFERENCE TO RELATED APPLICATIONS

This application claims benefit to U.S. Provisional Patent Application No. 61/773,102 entitled "INTER-LAYER REFERENCE PICTURE CONSTRUCTION FOR SPATIAL SCALABILITY WITH DIFFERENT ASPECT RATIOS" filed on Mar. 5, 2013, the disclosure of which is hereby incorporated by reference in its entirety.

TECHNICAL FIELD

This disclosure generally relates to video coding and compression. In particular, this disclosure is related to High Efficiency Video Coding (HEVC) and its extensions, e.g., scalable video coding (SVC), multi-view video and 3D coding (MVC, 3DV), etc. In some embodiments, the disclosure relates to coding (e.g., encoding or decoding) pictures having different picture aspect ratios (PARs) in SVC. In other embodiments, the disclosure relates to signaling regions in a reference layer and/or enhancement layer that relate to inter-layer prediction.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array and scanned in order to produce a one-dimensional vector of transform coefficients, and entropy coding may be applied to achieve even more compression.

SUMMARY

In accordance with some embodiments, an apparatus configured to code video information includes a processor configured upsample at least a portion of a reference layer picture to an upsampled picture having an upsampled picture size, the upsampled picture size comprising a horizontal upsampled picture size and a vertical upsampled picture size. The processor may further be configured to signal position information associated with the upsampled picture. For example, the processor may further be configured to determine the position information associated with the upsampled picture based on position information associated with an enhancement layer picture. The position information associated with the enhancement layer picture may comprise coordinates of the enhancement layer picture. The processor may further be configured to generate an inter-layer reference picture based on the upsampled picture and the position information.

In some embodiments, a size of the upsampled portion of the reference layer picture equals a size of the reference layer picture. The processor may further be configured to send or receive the signaled position information.

In some embodiments, the upsampled picture size is smaller than or equal to a size of the enhancement layer picture. For example, at least one of the horizontal or vertical upsampled picture sizes may be smaller than a horizontal picture size or vertical picture size, respectively, of the enhancement layer picture. The processor may further be configured to determine a size difference between the upsampled picture size and a size of the enhancement layer picture and increase the upsampled picture size based on the size difference. In some embodiments, the processor may further be configured to increase the upsampled picture size by padding pixel values to the upsampled picture, and determine a padded pixel value based on a value of a nearest boundary pixel in the upsampled picture.

In some embodiments, the upsampled picture size is larger than or equal to a size of the enhancement layer picture. For example, at least one of the horizontal or vertical upsampled picture sizes may be larger than a horizontal picture size or vertical picture size, respectively, of the enhancement layer picture. The processor may further be configured to determine a size difference between the upsampled picture size and a size of the enhancement layer picture and reduce the upsampled picture size based on the size difference. For example, the processor may be configured to decrease the upsampled picture size by cropping pixel values from the upsampled picture.

In some embodiments, the processor is further configured to determine an upsampling ratio for horizontal or vertical directions based at least in part on the signaled position information. In some embodiments, the apparatus comprises a video encoder. In other embodiments, the apparatus comprises a video decoder.

In another embodiment, a method of coding video information includes upsampling at least a portion of a reference layer picture to an upsampled picture having an upsampled picture size, the upsampled picture size comprising a horizontal upsampled picture size and a vertical upsampled picture size; and signaling position information associated with the upsampled picture. The method may further include determining the position information associated with the upsampled picture based on position information associated with an enhancement layer picture. For example, the position information associated with the enhancement layer picture may comprise coordinates of the enhancement layer picture. The method may further include generating an inter-layer reference picture based on the upsampled picture and the position information.

In another embodiment, a video coding apparatus includes a means for upsampling a reference layer picture to an upsampled picture having an upsampled picture size, the upsampled picture size comprising a horizontal upsampled picture size and a vertical upsampled picture size; and a means for signaling position information associated with the upsampled picture. The video coding apparatus may further include a means for determining the position information associated with the upsampled picture based on position information associated with an enhancement layer picture. The video coding apparatus may further include a determining a size difference between the upsampled picture size and a size of an enhancement layer picture and increase the upsampled picture size based on the size difference.

In another embodiment, a non-transitory computer-readable medium having stored thereon instructions that, when executed by a processor, cause the processor to upsample a reference layer picture to an upsampled picture having an upsampled picture size, the upsampled picture size comprising a horizontal upsampled picture size and a vertical upsampled picture size; and signal position information associated with the upsampled picture. The non-transitory computer-readable medium may further have stored thereon instructions that when executed causes the processor to determine the position information associated with the upsampled picture based on position information associated with an enhancement layer picture. The non-transitory computer-readable medium may further have stored thereon instructions that when executed causes the processor to determine a size difference between the upsampled picture size and a size of an enhancement layer picture and increase the upsampled picture size based on the size difference.

DETAILED DESCRIPTION

Figure 1:
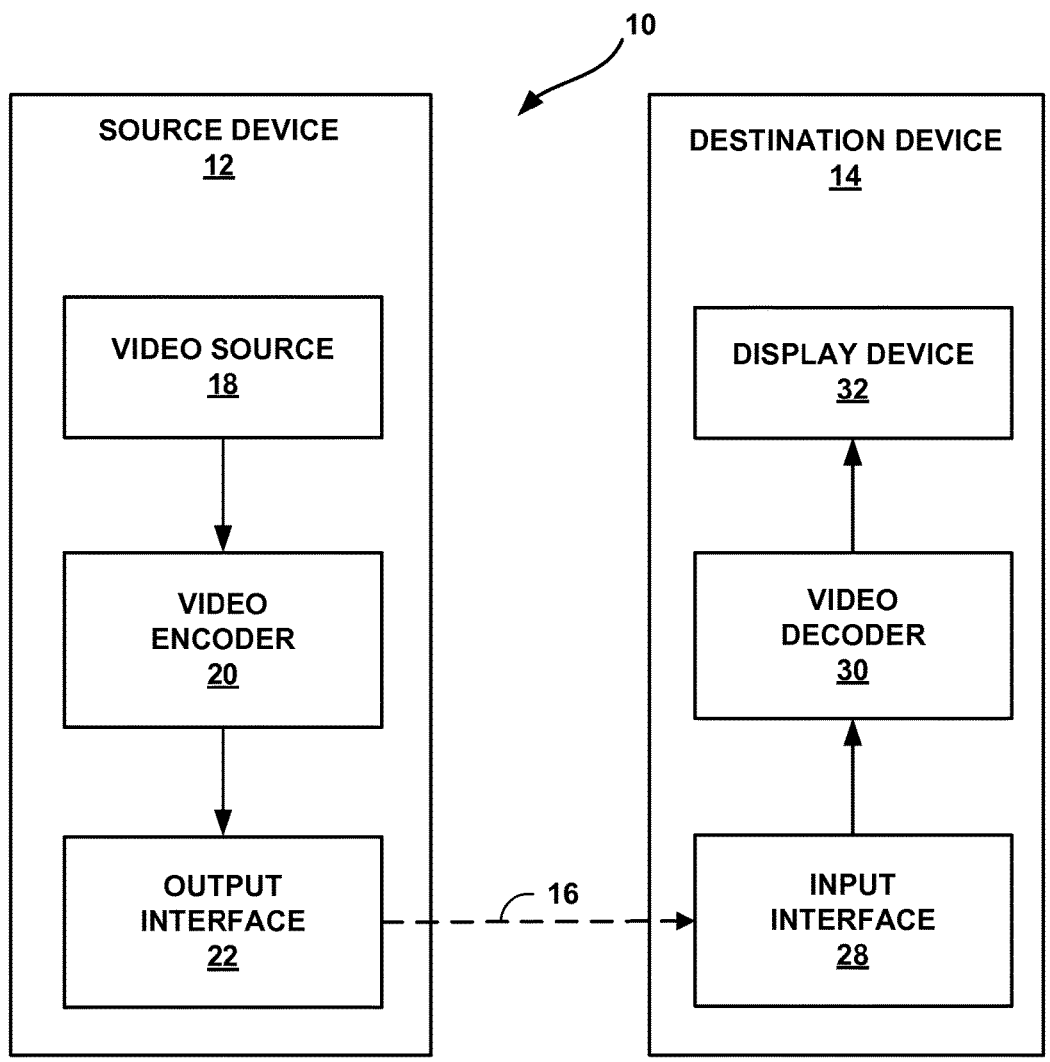
FIG. 1 is a block diagram illustrating an example video encoding and decoding system that may utilize techniques in accordance with aspects described in this disclosure.

The techniques described in this disclosure are generally related to scalable video coding (SVC) and/or multiview/3D video coding. For example, the techniques may be related to, and used with or within a High Efficiency Video Coding (HEVC) scalable video coding (SVC) extension. In SVC, there can be multiple layers of video information. A layer at the very bottom level or at the lowest level of the video information may serve as a base layer (BL) or reference layer (RL), and the layer at the very top level or at the highest level of the video information may serve as an enhanced layer (EL). The "enhanced layer" may be considered as being synonymous with an "enhancement layer," and these terms may be used interchangeably. Layers between the BL and EL may serve as ELs and/or RLs. For instance, a given layer may be an EL for a layer below (e.g., that precedes) the given layer, such as the base layer or any intervening enhancement layer. Further, the given layer may also serve as a reference layer for an enhancement layer above (e.g., subsequent to) the given layer. Any given layer in between the base layer (e.g., the lowest layer having, for example, a layer identification (ID) set or equal to "1") and the top layer (or the highest layer) may be used as a reference for inter-layer prediction by a layer higher relative to the given layer and may be determined using a layer lower to the given layer as a reference for inter-layer prediction.

For purposes of illustration only, the techniques described in the disclosure are described with examples including only two layers (e.g., a lower level layer such as the reference layer, and a higher level layer such as the enhanced layer). It should be understood that the examples described in this disclosure can be extended to examples with multiple reference layers and enhancement layers as well. In addition, for ease of explanation, the following disclosure mainly uses the term "pictures." However, these terms are not meant to be limiting. For example, the techniques described below can be used with other terms associated with video units, such as blocks (e.g., CU, PU, TU, macroblocks, etc.), slices, frames, blocks, etc.

To support inter-layer prediction in SHVC, when an upsampled reference layer picture is used as a reference picture in a reference picture list of an enhancement layer picture, a problem occurs when the resolution of the reference layer reconstructed picture, after upsampling, does not equal the resolution of the enhancement layer picture. For example, in general, upsampling a reference layer picture increases the resolution of the reference layer picture. In particular, upsampling a reference layer picture increases a number of pixels in the upsampled reference layer. Upsampling may be indicated by an upsampling scale factor $S=N/M$, where S indicates the upsampling scale factor, N indicates a number of output pixels in the upsampled reference layer picture, and M indicates a number of input pixels in the reference layer picture. The upsampling scale factor may be the same in horizontal and vertical directions, or the upsampling scale factor may be different. However, when an upsampled reference layer picture is used as a reference picture in a reference picture list of an enhancement layer picture, a problem occurs because the upsampling scale factor may not be known. In addition, if the upsampled reference layer picture does not have the same resolution as that of the enhancement layer picture, the upsampled reference layer picture cannot be used directly (e.g., without further modification) as an inter-layer reference picture.

Another problem may occur with respect to signaling of the upsampled reference layer region with respect to the coordination of an enhancement layer picture. For example, if an enhancement layer picture is predicted from multiple layers, signaling one set of parameters corresponding to one layer may be insufficient. In addition, it is possible that only part (e.g., a portion) of a reference layer picture may be used for inter-layer prediction.

To reduce coding complexity and provide robust support for inter-layer prediction in SHVC, techniques may be used to provide for inter-layer reference picture construction from layers having different aspect ratios. For example, in some embodiments, a method of coding video data includes upsampling at least a portion of a reference layer picture to an upsampled reference layer picture having an upsampled picture size. The upsampled picture size includes a horizontal upsampled picture size and a vertical upsampled picture size. Position information associated with the upsampled picture, such as an offset, may be signaled. For example, the position information associated with the upsampled picture may be determined based on position information associated with an enhancement layer picture. In particular, the position of the upsampled enhancement layer may be specified by an offset relative to a boundary of the enhancement layer picture. In addition, the position information associated with an enhancement layer picture based on may include coordinates of the enhancement layer picture. For example, the offset may specify a number of pixels in the enhancement layer picture. In addition, an inter-layer reference picture may be generated based on the upsampled picture and the position information.

Video Coding Standards

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC. In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a reference layer. For example, the spatial aspect ratio between the upsampled picture and the reference layer picture can be 1.0, 1.5, 2.0 or other different ratios. In other words, the spatial aspect of the upsampled picture may equal 1.0, 1.5, or 2.0 times the spatial aspect of the reference layer picture. In some examples, the scaling factor of the upsampled picture may be greater than the reference layer picture. For example, a size of pictures in the enhancement layer may be greater than a size of pictures in the reference layer. In this way, it may be possible, although not a limitation, that the spatial resolution of the enhancement layer is larger than the spatial resolution of the reference layer.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, inter-layer mode prediction, and inter-layer residual prediction. Inter-layer intra prediction uses the reconstruction of collocated blocks in a reference layer to predict the current block in the enhancement layer. Inter-layer motion prediction uses motion of the reference layer to predict motion in the enhancement layer. Inter-layer mode prediction predicts the mode in the enhancement layer based on the mode in the reference layer. Inter-layer residual prediction uses the residue of the reference layer to predict the residue of the enhancement layer.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In addition, in some embodiments, system 10 can be implemented in a single device. For example, any such single device, including a telephone handset, may comprise both source device 12 and destination device 14, as well as computer-readable medium 16. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. In some embodiments, a wireless communication device, such as a cellular telephone, can comprise source device 12, including video source 18, video encoder 20, and output interface 22. Destination device 14 includes input interface 28, video decoder 30, and display device 32. In some embodiments, a wireless communication device, such as a cellular telephone, can comprise destination device 14, including input interface 28, video decoder 30, and display device 32. For example, in some cases, a single wireless communication device can comprise both source device 12 and destination device 14. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. For example, in some embodiments in which source device 12 and destination device 14 are implemented as a single device, such as a wireless handset, computer-readable medium 16 can include any storage media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, the CU is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, the TU may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
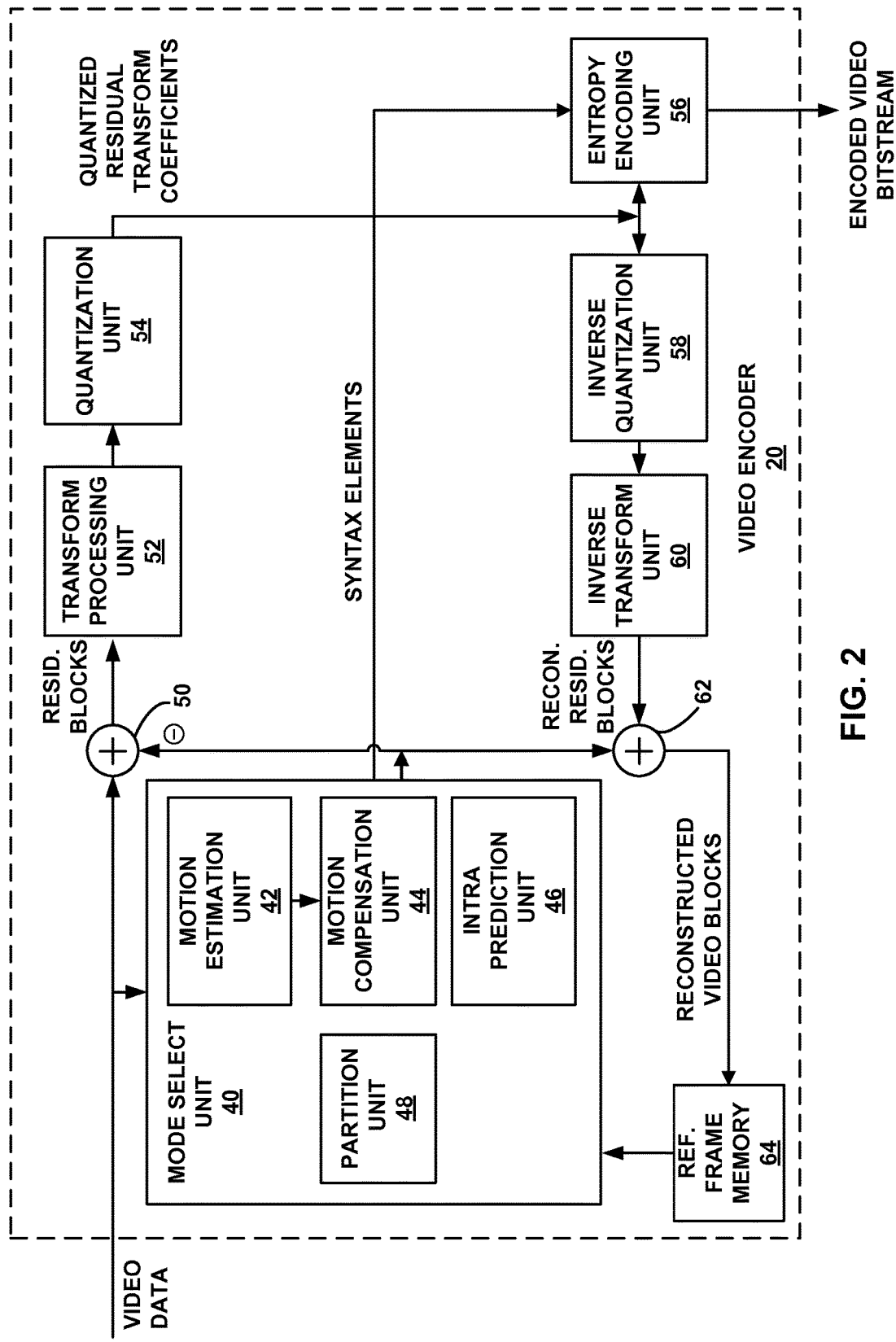
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure, including the methods described below with respect to FIGS. 9-12, may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
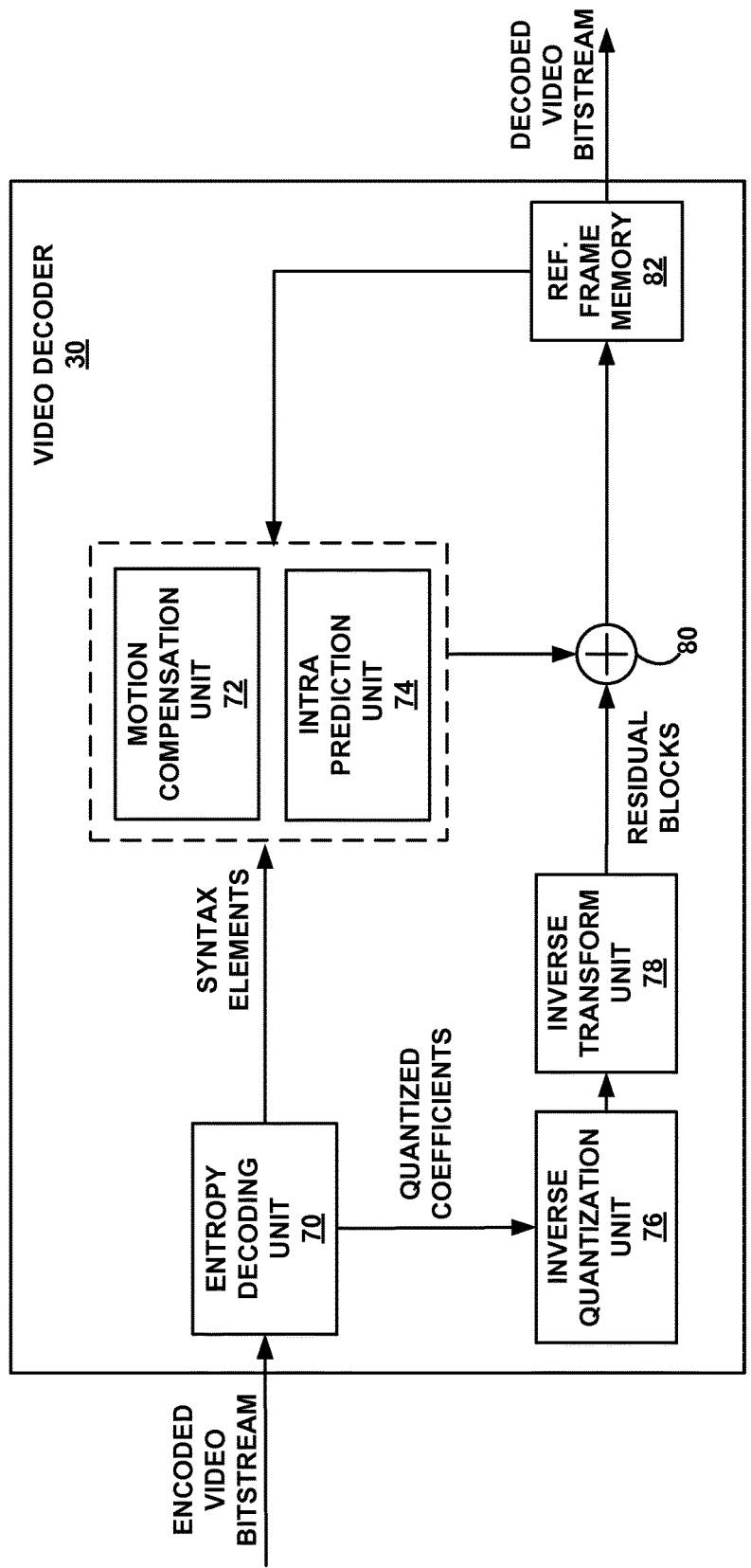
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including the methods described below with respect to FIGS. 9-12. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Motion Compensation in HEVC

As mentioned above, HEVC is the next generation of video coding standard. In general, HEVC follows the framework of previous video coding standards. The motion compensation loop of HEVC can be kept the same as that in H.264/AVC, e.g., the reconstruction of the current frame Î equals de-quantized coefficients r plus temporal prediction P:

$$Î = r + P \qquad (1)$$

where P indicates uni-directional prediction for P frames or slices or bi-directional prediction for B frames or slices.

The unit of motion compensation in HEVC can be different from that in previous video coding standards. In fact, the concept of macroblock in previous video coding standards does not exist in HEVC. Instead, the macroblock concept is replaced by a highly flexible hierarchical structure based on a generic quadtree scheme. Within this scheme, three types of blocks, e.g., Coding Unit (CU), Prediction Unit (PU), and Transform Unit (TU), are defined. CU is the basic unit of region splitting. CU is analogous to the concept of macroblock, but CU does not restrict the maximum size and CU allows recursive splitting into four equal size CUs to improve the content adaptivity. PU is the basic unit of inter/intra prediction and PU may contain multiple arbitrary shape partitions in a single PU to effectively code irregular image patterns. TU is the basic unit of transform. TU can be defined independently from the PU; however, TU's size is limited to the CU which the TU belongs to. This separation of the block structure into three different concepts allows each to be optimized according to its role, which results in the improved coding efficiency.

Scalable Video Coding

Figure 4:
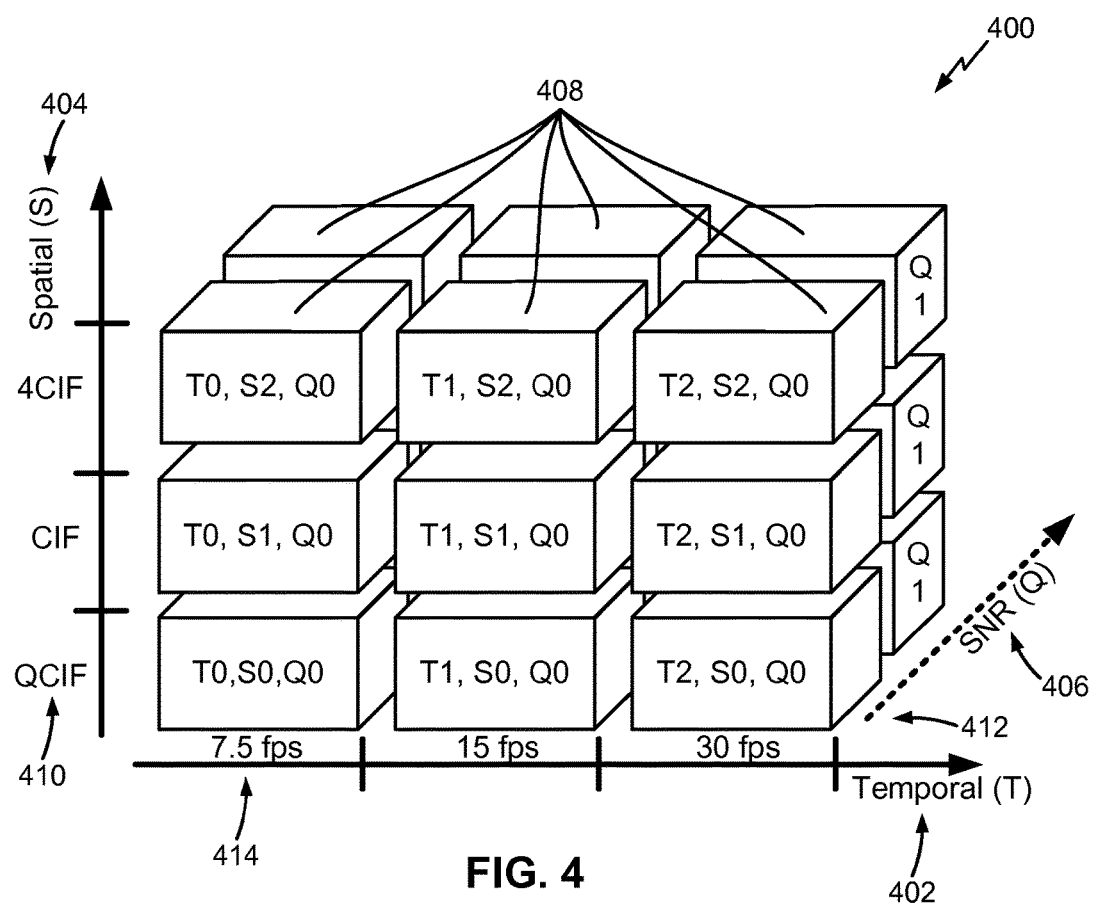
FIG. 4 is a block diagram illustrating scalabilities in three different dimensions according to aspects of this disclosure.

An example of scalabilities 400 in different dimensions is shown in FIG. 4. In the example, scalabilities are enabled in three dimensions 402, 404, 406. In a time dimension 402, frame rates, for example, with 7.5 Hz, 15 Hz or 30 Hz can be supported by temporal scalability (T). When spatial scalability (S) 404 is supported, different resolutions, for example, such as QCIF, CIF and 4CIF are enabled. For each specific spatial resolution and frame rate, the SNR (Q) layers 406 can be added to improve the picture quality. Bitstreams from each layer 402, 404, 406 can be multiplexed together into a single bitstream. Once video content has been encoded in such a scalable way, an extractor tool may be used to adapt the actual delivered content according to application requirements, which are dependent e.g., on the clients or the transmission channel. In the example shown in FIG. 4, each cubic 408 contains the pictures with the same frame rate (temporal level), spatial resolution and SNR layers. Better representation can be achieved by adding those cubes 408 (pictures) in any dimension 402, 404, 406. Combined scalability is supported when there are two, three or even more scalabilities enabled.

According to the SVC specification, the pictures with the lowest spatial layer 410 and the lowest quality layer 412 are compatible with H.264/AVC, and the pictures at the lowest temporal level 414 form the temporal base layer, which can be enhanced with pictures at higher temporal levels. In addition to the H.264/AVC compatible layer, several spatial and/or SNR enhancement layers can be added to provide spatial and/or quality scalabilities. SNR scalability 406 is also referred as quality scalability. Each spatial enhancement layer 404 or SNR enhancement layer 406 itself may be temporally scalable, with the same temporal scalability structure as the H.264/AVC compatible layer. For one spatial or SNR enhancement layer, the lower layer the spatial or SNR enhancement layer depends on is also referred as the reference layer (e.g., base layer) of that specific spatial or SNR enhancement layer.

Figure 5:
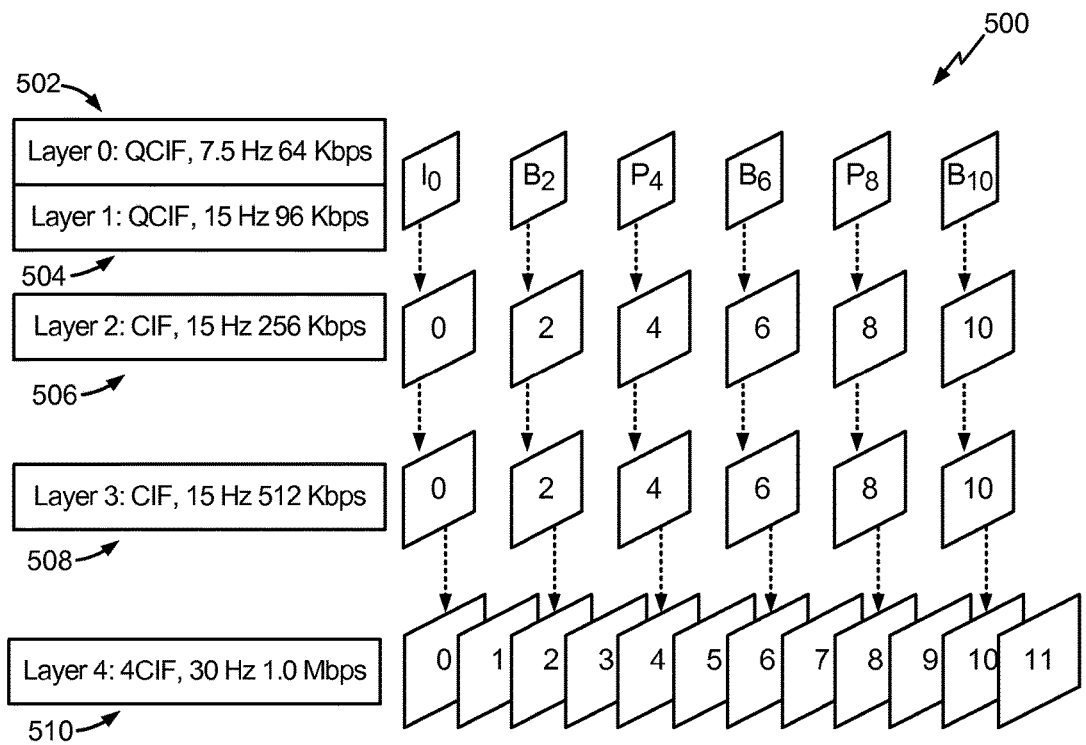
FIG. 5 is a block diagram illustrating an example structure of a scalable video coding (SVC) bitstream according to aspects of this disclosure.

An example of SVC coding structure 500 is shown in FIG. 5. The pictures with the lowest spatial and quality layer (pictures in layer 0 502 and layer 1 504, with QCIF resolution) are compatible with H.264/AVC. Among them, those pictures of the lowest temporal level form the temporal base layer, as shown in layer 0 502 of FIG. 5. This temporal base layer (layer 0) 502 can be enhanced with pictures of higher temporal levels (layer 1) 504. In addition to the H.264/AVC compatible layer 504, several spatial and/or SNR enhancement layers 506, 508, 510 can be added to provide spatial and/or quality scalabilities. For instance, the enhancement layer can be a CIF representation with the same resolution as layer 2 506. In the example, layer 3 508 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 510 provides a 4CIF enhancement layer, which further increases the frame rate from 15 Hz to 30 Hz.

Figure 6:
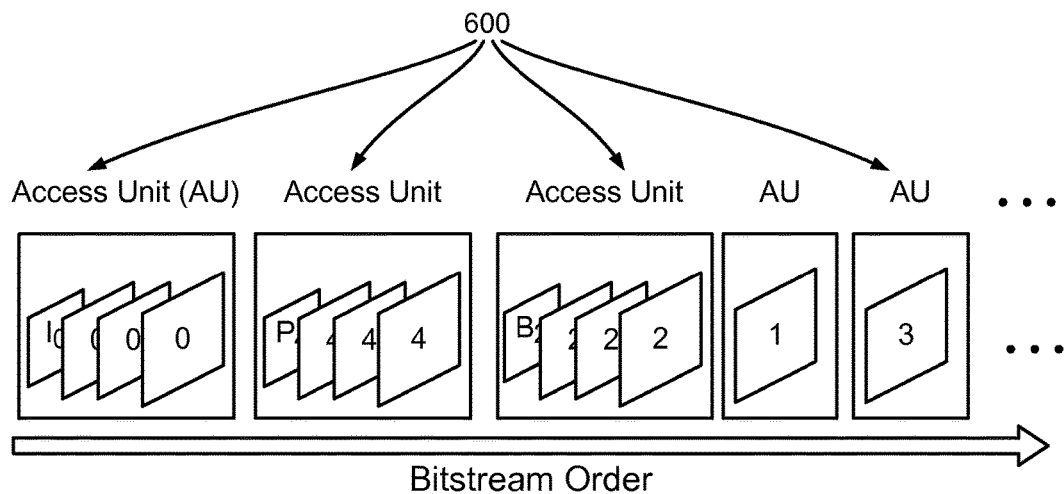
FIG. 6 is a block diagram illustrating example SVC access units in a bitstream according to aspects of this disclosure.

As shown in FIG. 6, the coded slices in the same time instance are successive in the bitstream order and form one access unit 600 in the context of SVC. Those SVC access units 600 then follow the decoding order, which could be different from the display order and is decided by, for example, the temporal prediction relationship.

Figure 7:
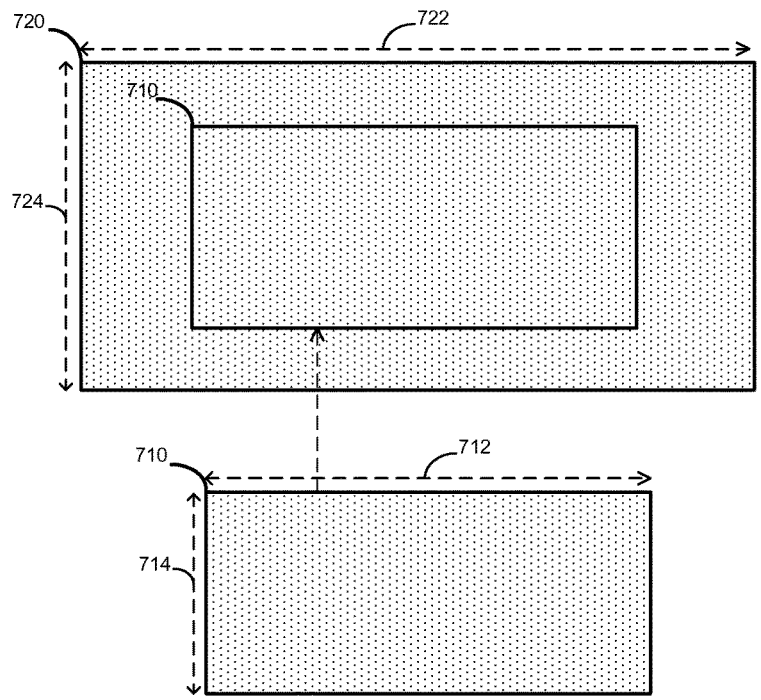
FIG. 7 is a diagram illustrating an example of picture aspect ratio scalability between a reference layer and an enhancement layer.

FIG. 7 illustrates a conceptual diagram of an example of picture aspect ratio scalability between a reference layer and an enhancement layer. In some embodiments, Picture Aspect Ratio (PAR) is the width:height ratio of a captured picture, where width and height are measured in the same length (spatial measurement) units. Picture aspect ratio may be expressed as X:Y, where X is horizontal width and Y is vertical height (in arbitrary units of spatial distance). In some embodiments, Picture Sample Aspect Ratio (PSAR) is the ratio between the horizontal distance between the columns and the vertical distance between the rows of the luma sample array in a picture. Picture sample aspect ratio may be expressed as h:v, where h is horizontal width and v is vertical height (in arbitrary units of spatial distance). FIG. 7 illustrates an example in which PSAR is the same between a reference layer and an enhancement layer, and the reference layer is a cropped version of the enhancement layer. In particular, as shown, a reference layer 710 can comprise a horizontal width 712 and a vertical height 714. For example, the horizontal width 712 may be 853 pixels and the vertical height 714 may be 480 pixels. An enhancement layer 720 can comprise a horizontal width 722 and a vertical height 724. For example, the horizontal width 722 may be 1280 pixels and the vertical height 724 may be 720 pixels. In this figure, the spatial resolution of the enhancement layer 720 is 1280×720, and the spatial resolution of the reference layer 710 is 853×480 (WVGA). Both the reference layer 710 and enhancement layer 720 have PSAR of 1. In this example, both the reference layer 710 and enhancement layer 720 have a PAR of 16:9.

Figure 8:
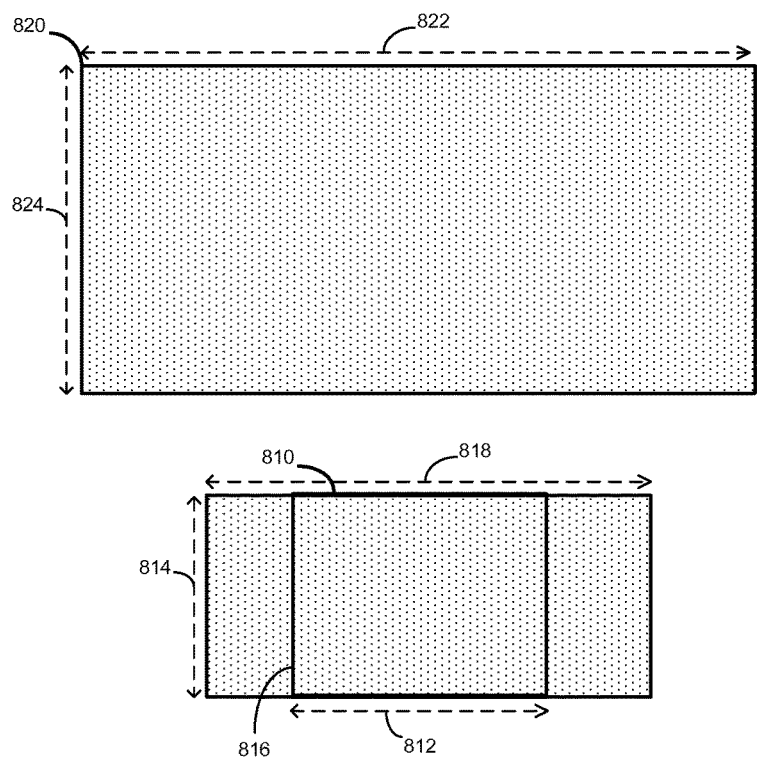
FIG. 8 is a diagram illustrating another example of picture aspect ratio scalability between a reference layer and an enhancement layer.

FIG. 8 illustrates a conceptual diagram of another example of picture aspect ratio scalability between a reference layer and an enhancement layer. FIG. 8 illustrates an example in which PSAR is the same between a reference layer and an enhancement layer, and the reference layer is a scaled and cropped version of the enhancement layer. In particular, as shown, a reference layer 810 can comprise a horizontal width 812 and a vertical height 814. For example, the horizontal width 812 may be 640 pixels and the vertical height 814 may be 480 pixels. An enhancement layer 820 can comprise a horizontal width 822 and a vertical height

824. For example, the horizontal width 822 may be 1280 pixels and the vertical height 824 may be 720 pixels. The reference layer 810 may be scaled, and it is possible part of the scaled region is used for to predict the enhancement layer 820. In FIG. 8, the spatial resolution of the enhancement layer is 1280×720 (PAR 16:9) and of the reference layer is 640×480 (PAR 4:3), and both the layers have PSAR of 1. So, the enhancement layer 820 has a different picture aspect ratio than the reference layer 810.

In SVC, the regions of the upsampled reference layer picture that may be used for inter-layer prediction may be defined in the sequence parameter set. Such a region may be referred to as the upsampled region. The upsampled region may be smaller or larger than the current picture (e.g., an enhancement layer picture) in either vertical or horizontal dimensions. Table 1 illustrates an example of a sequence parameter set svc extension.

TABLE 1

|  | C | Descriptor |
|---|---|---|
| seq_parameter_set_svc_extension( ) { | | |
| ... | | |
|     seq_scaled_ref_layer_left_offset | 0 | se(v) |
|     seq_scaled_ref_layer_top_offset | 0 | se(v) |
|     seq_scaled_ref_layer_right_offset | 0 | se(v) |
|     seq_scaled_ref_layer_bottom_offset | 0 | se(v) |
| } | | |
| ... | | |
| } | | |

In addition, similar information may be present in a slice header. If explicitly signaled, this information will overwrite the information signaled in sequence parameter set. Table 2 illustrates a slice header in scalable extension.

TABLE 2

|  | C | Descriptor |
|---|---|---|
| slice_header_in_scalable_extension( ) { | | |
| ... | | |
|     scaled_ref_layer_left_offset | 2 | se(v) |
|     scaled_ref_layer_top_offset | 2 | se(v) |
|     scaled_ref_layer_right_offset | 2 | se(v) |
|     scaled_ref_layer_bottom_offset | 2 | se(v) |
| } | | |
| ... | | |
| } | | |

To support inter-layer prediction in SHVC when an upsampled reference layer picture is utilized as a reference picture in a reference picture list of the enhancement layer picture, difficulties may arise. For example, the reference layer reconstructed picture, after upsampling, may not have the same resolution as that of the enhancement layer picture. Thus, the upsampled reference layer picture cannot be directly used as an inter-layer reference picture.

In addition, when signaling the reference layer upsampled region with respect to the coordination of an enhancement layer picture, additional difficulties may arise. For example, an enhancement layer picture might be predicted from multiple layers, thus signaling one set of parameter corresponding to one layer could be insufficient. Furthermore, it might be possible that only part of a reference layer picture might be used for inter-layer prediction.

To reduce coding complexity and provide robust support for inter-layer prediction in SHVC, techniques may be used to provide for inter-layer reference picture construction for layers with different aspect ratios. For example, in some embodiments, a method of coding video data includes upsampling at least a portion of a reference layer picture to an upsampled picture having an upsampled picture size, the upsampled picture size comprising a horizontal upsampled picture size and a vertical upsampled picture size, and signaling position information associated with the upsampled picture. The method may further include determining the position information associated with the upsampled picture based on position information associated with an enhancement layer picture. For example, the position information associated with the enhancement layer picture may include coordinates of the enhancement layer picture, such as an offset relative to a boundary of the enhancement layer picture. If no position information is signaled, a default value, such as zero, may be assumed. In some embodiments, a size of the upsampled portion of the reference layer picture equals a size of the reference layer picture. In addition, in some embodiments, at least one of the horizontal or vertical upsampled picture sizes may match (e.g., equal) a horizontal picture size or a vertical picture size, respectively, of an enhancement layer picture. An inter-layer reference picture may be generated based on the upsampled picture and the position information.

For example, in some embodiments, only a selective part of a reference layer picture is used to generate an inter-layer reference picture, based on a signaled relevant window for the current layer for that specific reference layer. The selective part of the reference layer picture within the relevant region may be upsampled to a picture with a size equal to the upsampled region, after upsampling, the size of the upsampled region is always smaller than or equal to the picture size the enhancement layer picture. The upsampled region may be further signaled and is defined using the coordinates of the enhancement layer picture.

In other embodiments, the whole reference layer picture is upsampled. The upsampled region may be larger than the enhancement layer picture in either vertical or horizontal dimension. As such, the upsampled region may need to be cropped (e.g., reduced in area size). When the upsampled region is smaller than the enhancement layer picture in either vertical or horizontal dimension, the upsampled region may need to be padded. The upsampled region may be further signaled and may be defined using the coordinates of the enhancement layer picture.

In each of these embodiments, the signaled relevant window or the whole picture size of the reference layer as well as the upsampled region may be used to derive the upsampling ratio for horizontal or vertical direction. In addition, based on the information of the upsampled region, pixel values may be padded (e.g., added) around the aligned upsampled region of the reference layer picture to enlarge the upsampled picture to be the same size as the current picture (e.g., the enhancement layer picture). For example, the padding can be done in a way that pixels with value equal to 128 (or 2<<N, wherein N+1 is the bit depth). In addition, padding can performed such that the left padding region is padded horizontally from the pixel value in the boundary pixel of the aligned upsampled region, the right padding region is padded horizontally from the pixel value in the boundary pixel of the aligned upsampled region; the top padding region is padded vertically from the pixel value in the boundary pixel of the aligned upsampled region; the bottom padding region is padded vertically from the pixel value in the boundary pixel of the aligned upsampled region;

the top-left, top-right, bottom-left and bottom-right padding region, if available, is padded horizontally and after other regions are padded.

Figure 9:
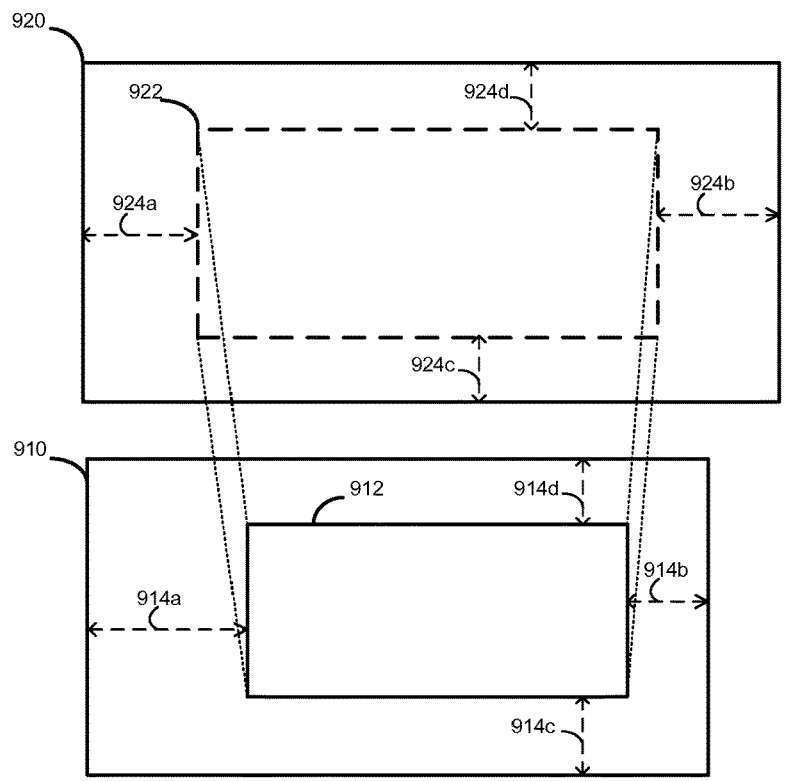
FIG. 9 is a diagram illustrating an example of upsampling a portion of a reference layer picture to an enhancement layer according to an embodiment.

FIG. 9 is a diagram illustrating an example of upsampling a portion of a reference layer picture to an enhancement layer according to an embodiment. In particular, as shown, a reference layer 910 can comprise a sub-portion 912. The sub-portion 912 may be specified based on a reference layer left offset 914a, reference layer right offset 914b, reference layer bottom offset 914c, and reference layer top offset 914d. For example, the reference layer left offset 914a may specify a distance (e.g., an offset) between a left boundary of the reference layer 910 and a left boundary of the sub-portion 912. The reference layer right offset 914b may specify a distance between a right boundary of the reference layer 910 and a right boundary of the sub-portion 912. The reference layer bottom offset 914c may specify a distance between a bottom boundary of the reference layer 910 and a bottom boundary of the sub-portion 912. The reference layer top offset 914d may specify a distance between a top boundary of the reference layer 910 and a top boundary of the sub-portion 912.

The sub-portion 912 of the reference layer 910 may be upsampled to an upsampled picture 922 that is a sub-portion of an enhancement layer 920. In this example, the size of the upsampled picture 922 includes a horizontal upsampled picture size and a vertical upsampled picture size, but the horizontal or vertical upsampled picture sizes are less than a horizontal picture size and a vertical picture size, respectively, of the enhancement layer 920.

The upsampled picture 922 may be specified based on an enhancement layer left offset 924a, enhancement layer right offset 924b, enhancement layer bottom offset 924c, and enhancement layer top offset 924d. For example, the enhancement layer left offset 924a may specify a distance (e.g., an offset) between a left boundary of the enhancement layer 920 and a left boundary of the sub-portion 922. The enhancement layer right offset 924b may specify a distance between a right boundary of the enhancement layer 920 and a right boundary of the sub-portion 922. The enhancement layer bottom offset 924c may specify a distance between a bottom boundary of the enhancement layer 920 and a bottom boundary of the sub-portion 922. The enhancement layer top offset 924d may specify a distance between a top boundary of the enhancement layer 920 and a top boundary of the sub-portion 922.

Figure 10A:
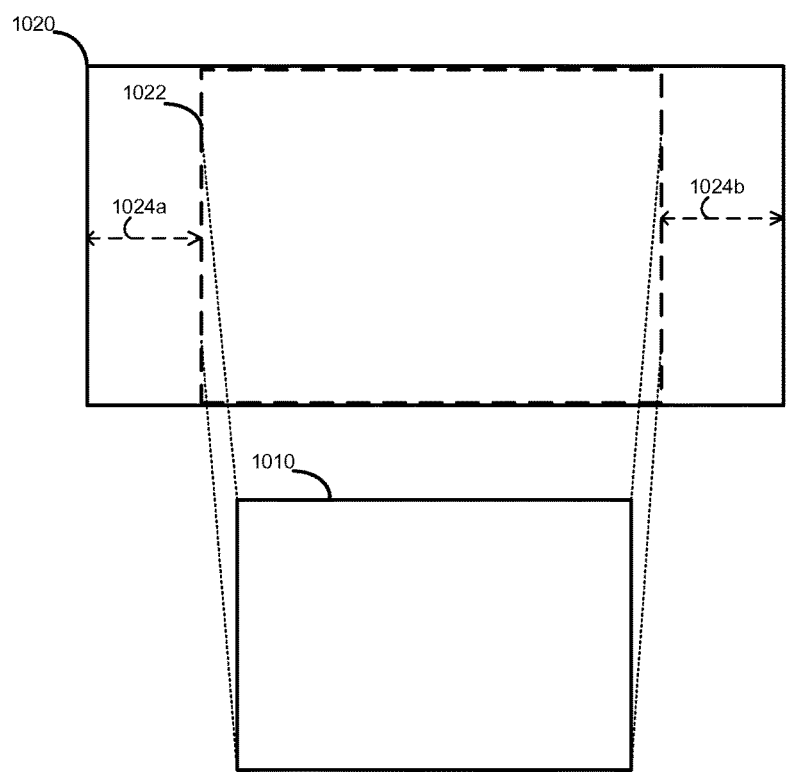
FIG. 10A is a diagram illustrating an example of upsampling a reference layer picture to an enhancement layer according to an embodiment.
Figure 10B:
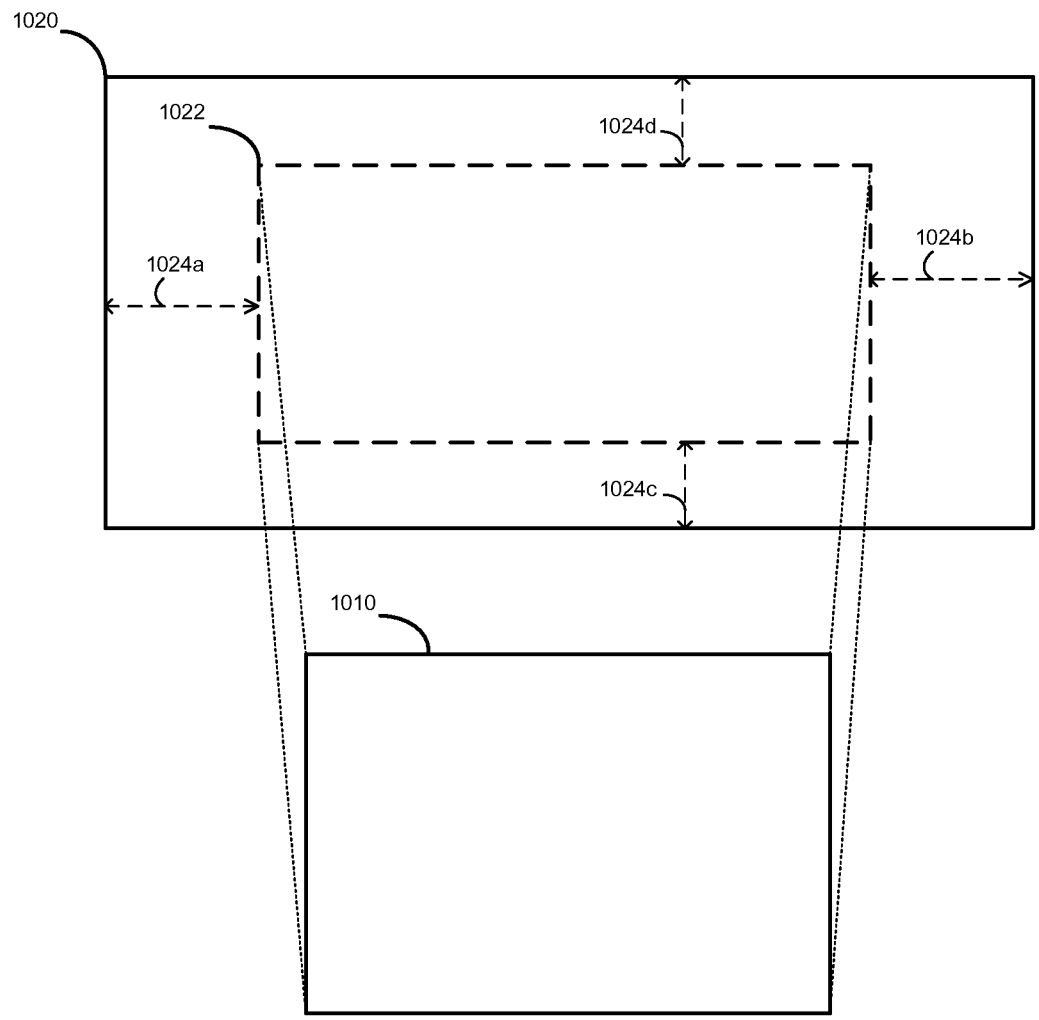
FIG. 10B is a diagram illustrating an example of upsampling a reference layer picture to an enhancement layer according to another embodiment.

FIGS. 10A and 10B are diagrams illustrating an example of upsampling a reference layer picture to an enhancement layer wherein at least one of the horizontal or vertical upsampled picture sizes is smaller than a horizontal picture size or vertical picture size, respectively, of the enhancement layer picture. In particular, in the example shown in FIG. 10A, a horizontal upsampled picture size is smaller than the horizontal picture size of the enhancement layer picture. For example, a reference layer 1010 may be upsampled to an upsampled picture 1022 that is a sub-portion of an enhancement layer 1020. The size of the upsampled picture 1022 includes a horizontal upsampled picture size and a vertical upsampled picture size. The vertical upsampled picture size of the upsampled picture 1022 matches (e.g., equals) the vertical picture size of the enhancement layer 1020, but the horizontal picture size of the upsampled picture 1022 is smaller than the horizontal picture size of the enhancement layer 1020. To specify the position of the upsampled picture 1022, position information associated with the upsampled picture 1022 relative to the enhancement layer 1020 may be signaled. For example, the upsampled picture 1022 may be specified based on an enhancement layer left offset 1024a and the enhancement layer right offset 1024b. For example, the enhancement layer left offset 1024a may specify a distance (e.g., an offset) between a left boundary of the enhancement layer 1020 and a left boundary of the upsampled picture 1022. The enhancement layer right offset 1024b may specify a distance between a right boundary of the enhancement layer 1020 and a right boundary of the upsampled picture 1022. The enhancement layer left offset 1024a and the enhancement layer right offset 1024b may be specified based on the coordinates of the enhancement layer picture 1020.

In the example shown in FIG. 10B, both of a horizontal upsampled picture size and vertical upsampled picture size are smaller than the horizontal picture size and vertical picture size, respectively, of the enhancement layer. For example, the reference layer 1010 may be upsampled to an upsampled picture 1022 that is a sub-portion of an enhancement layer 1020. The vertical upsampled picture size of the upsampled picture 1022 is smaller than the vertical picture size of the enhancement layer 1020, and the horizontal picture size of the upsampled picture 1022 is smaller than the horizontal picture size of the enhancement layer 1020. To specify the position of the upsampled picture 1022, position information may be signaled. For example, the upsampled picture 1022 may be specified based on an enhancement layer left offset 1024a, the enhancement layer right offset 1024b, the enhancement layer bottom offset 1024c, and the enhancement layer top offset 1024d. For example, the enhancement layer left offset 1024a may specify a distance between a left boundary of the enhancement layer 1020 and a left boundary of the upsampled picture 1022. The enhancement layer right offset 1024b may specify a distance between a right boundary of the enhancement layer 1020 and a right boundary of the upsampled picture 1022. The enhancement layer bottom offset 1024c may specify a distance between a bottom boundary of the enhancement layer 1020 and a bottom boundary of the upsampled picture 1022. The enhancement layer top offset 1024d may specify a distance between a top boundary of the enhancement layer 1020 and a top boundary of the upsampled picture 1022. The enhancement layer left offset 1024a, the enhancement layer right offset 1024b, the enhancement layer bottom offset 1024c, and the enhancement layer top offset 1024d may be specified based on the coordinates of the enhancement layer picture 1020.

Figure 11A:
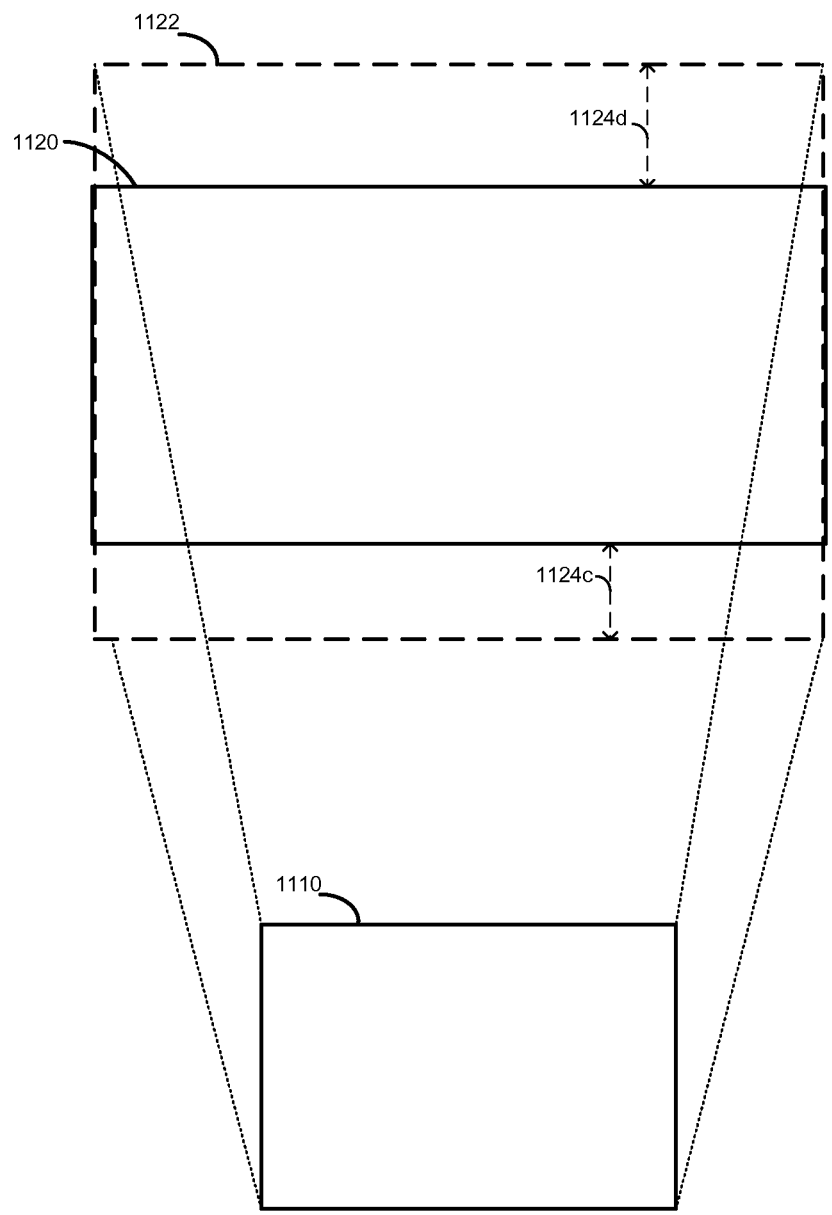
FIG. 11A is a diagram illustrating an example of upsampling a reference layer picture to an enhancement layer according to another embodiment.
Figure 11B:
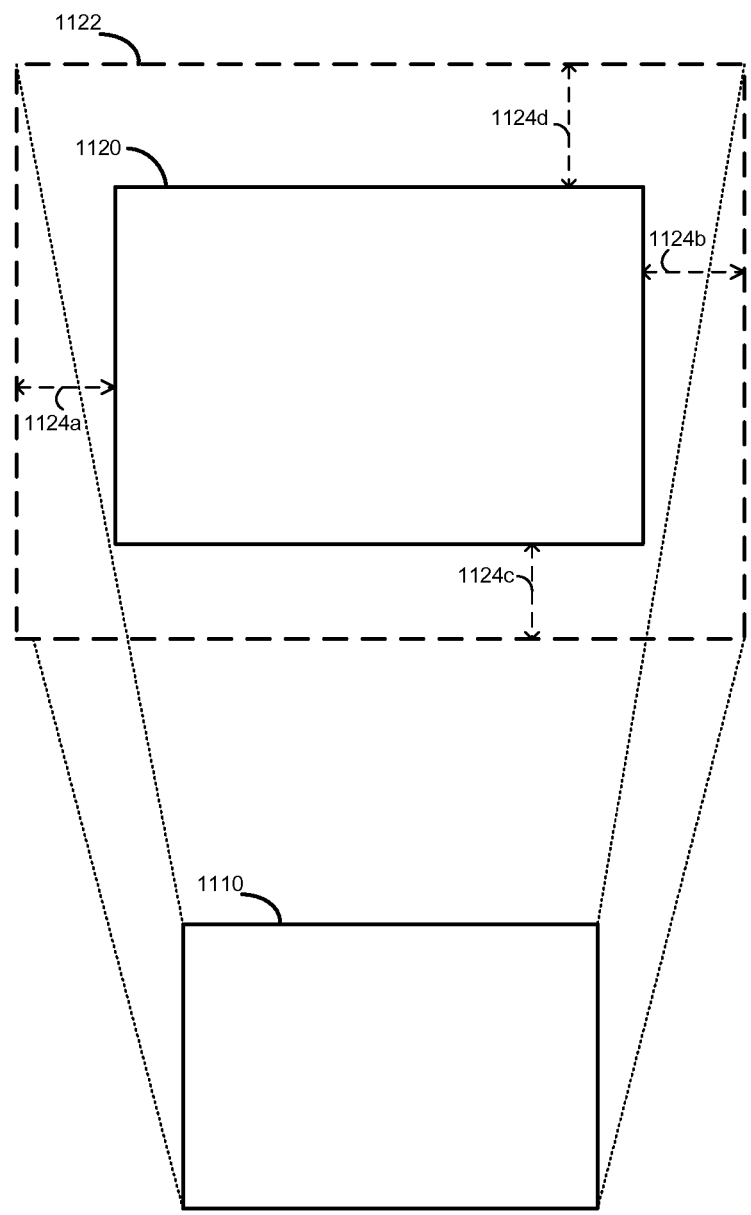
FIG. 11B is a diagram illustrating an example of upsampling a reference layer picture to an enhancement layer according to another embodiment.

FIGS. 11A and 11B are diagrams illustrating an example of upsampling a reference layer picture to an enhancement layer wherein at least one of the horizontal or vertical upsampled picture sizes is larger than a horizontal picture size or vertical picture size, respectively, of the enhancement layer picture. In particular, in the example shown in FIG. 11A, a vertical upsampled picture size is larger than the vertical picture size of the enhancement layer. For example, a reference layer 1110 may be upsampled to an upsampled picture 1122 that is a larger than an enhancement layer 1120. In this example, the size of the upsampled picture 1122 includes a horizontal upsampled picture size and a vertical upsampled picture size. The vertical upsampled picture size of the upsampled picture 1122 is larger than the vertical picture size of the enhancement layer 1120, but the horizontal picture size of the upsampled picture 1122 matches the horizontal picture size of the enhancement layer 1120. To specify the position of the upsampled picture 1122, position information may be signaled. For example, the upsampled picture 1122 may be specified based on an enhancement layer bottom offset 1124c and the enhancement layer top offset 1124d. For example, the enhancement layer bottom offset 1124c may specify a distance between a bottom boundary of the enhancement layer 1120 and a bottom boundary of the upsampled picture 1122. The enhancement layer top offset 1124d may specify a distance between a top boundary of the enhancement layer 1120 and a top boundary of the upsampled picture 1122. The enhancement layer bottom offset 1124c and the enhancement layer top offset 1124d may be specified based on the coordinates of the enhancement layer picture 1120.

In the example shown in FIG. 11B, both of a horizontal upsampled picture size and vertical upsampled picture size are larger than the horizontal picture size and vertical picture size, respectively, of the enhancement layer. For example, a reference layer 1110 may be upsampled to an upsampled picture 1122 that is a larger than an enhancement layer 1120. The vertical upsampled picture size of the upsampled picture 1122 is larger than the vertical picture size of the enhancement layer 1120, and the horizontal picture size of the upsampled picture 1122 is larger than the horizontal picture size of the enhancement layer 1120. To specify the position of the upsampled picture 1122, position information may be signaled. For example, the upsampled picture 1122 may be specified based on an enhancement layer left offset 1124a, the enhancement layer right offset 1124b, the enhancement layer bottom offset 1124c, and the enhancement layer top offset 1124d. For example, the enhancement layer left offset 1124a may specify a distance between a left boundary of the enhancement layer 1120 and a left boundary of the upsampled picture 1122. The enhancement layer right offset 1124b may specify a distance between a right boundary of the enhancement layer 1120 and a right boundary of the upsampled picture 1122. The enhancement layer bottom offset 1124c may specify a distance between a bottom boundary of the enhancement layer 1120 and a bottom boundary of the upsampled picture 1122. The enhancement layer top offset 1124d may specify a distance between a top boundary of the enhancement layer 1120 and a top boundary of the upsampled picture 1122. The enhancement layer left offset 1124a, the enhancement layer right offset 1124b, the enhancement layer bottom offset 1124c, and the enhancement layer top offset 1124d may be specified based on the coordinates of the enhancement layer picture 1120.

For purposes of illustration, the techniques described in the disclosure are described using examples where there are only two layers. One layer can include a lower level layer or reference layer, and another layer can include a higher level layer or enhancement layer. For example, the reference layer can include a base layer or a temporal reference on an enhancement layer, and the enhancement layer can include an enhanced layer relative to the reference layer. It should be understood that the examples described in this disclosure extend to multiple enhancement layers as well.

In some embodiments, a relevant window in the base view is signaled, relative to the picture size of the reference layer and the boundary of the relevant window is aligned or positioned within the reference layer picture. In addition, the upsampled region may also be signaled. The boundary of the upsampled region may be within the enhancement layer picture. When an inter-layer reference picture is to be added into a reference picture list of the enhancement layer picture, the upsampled region is extended (e.g., by padding) to be the same size as that of the enhancement layer picture.

Syntax elements may be signaled in the video parameter set. Alternatively, syntax elements can be transmitted by a first flag in the bitstream, e.g., in a VPS (video parameter set), SPS (sequence parameter set), PPS (picture parameter set), slice header, or an SEI (supplemental enhancement information) message.

The syntax elements scaled_ref_layer_left_offset[i][j], scaled_ref_layer_top_offset[i][j], scaled_ref_layer_right_offset[i][j], scaled_ref_layer_bottom_offset[i][j] may be collectively referred to as offset between the scaled (upsampled) region and the enhancement layer picture. The values they represent may be referred to as scaled reference layer offsets, of the j-th reference layer of layer i.

The syntax elements rel_scaled_ref_layer_left_offset[i][j], rel_scaled_ref_layer_top_offset[i][j], rel_scaled_ref_layer_right_offset[i][j], and rel_scaled_ref_layer_bottom_offset[i][j] may be collectively referred to as offset syntax elements of the relevant region of the reference layer, and the values they indicate may be referred to as the relevant region offsets of the j-th reference layer of layer i. Table 3 illustrates an example of Video Parameter Set Extension Syntax.

TABLE 3

| | Descriptor |
|---|---|
| vps_extension( ) { | |
| ... | |
|   for( i = 0; i <= vps_max_layers_minus1; i++ ) | |
|     for( j = 0; j < num_direct_ref_layers[ i ]; j++ ) | |
|     { | |
|       scaled_ref_layer_left_offset[ i ][ j ] | ue(v) |
|       scaled_ref_layer_top_offset[ i ][ j ] | ue(v) |
|       scaled_ref_layer_right_offset[ i ][ j ] | ue(v) |
|       scaled_ref_layer_bottom_offset[ i ][ j ] | ue(v) |
|       rel_ref_layer_left_offset[ i ][ j ] | ue(v) |
|       rel_ref_layer_top_offset[ i ][ j ] | ue(v) |
|       rel_ref_layer_right_offset[ i ][ j ] | ue(v) |
|       rel_ref_layer_bottom_offset[ i ][ j ] | ue(v) |
|     } | |
| ... | |
| } | |

In addition, scaled_ref_layer_left_offset[i][j], scaled_ref_layer_top_offset[i][j], scaled_ref_layer_right_offset[i][j], scaled_ref_layer_bottom_offset[i][j] may specify the distance (e.g., in units of two luma samples), of the left, top, right, and bottom boundaries of the scaled reference region from the j-th reference layer of layer i to the left, top, right and bottom boundaries, respectively, of a current picture (e.g., the enhancement layer picture) of layer i that is being decoded. When not present, the values of these syntax elements may be inferred to be equal to 0.

Also, rel_scaled_ref_layer_left_offset[i][j], rel_scaled_ref_layer_top_offset[i][j], rel_scaled_ref_layer_right_offset[i][j], rel_scaled_ref_layer_bottom_offset[i][j] may specify the distance (e.g., in units of two luma samples), of the left, top, right, and bottom boundaries of the decoded reference layer picture from the j-th reference layer of layer i with respect to the left, top, right and bottom boundaries, respectively, of the relevant region of the decoded reference layer picture that is to be scaled for inter-layer-prediction for current picture (e.g., the enhancement layer picture) of layer i. When not present, the values of these syntax elements may be inferred to be equal to 0.

Alternatively, the signaling of the offsets for each reference layer may be conditioned on a flag that is signaled for each reference layer, described as follows. For example, Table 4 illustrates an example of vps extensions.

TABLE 4

| | Descriptor |
|---|---|
| vps_extension( ) { | |
| ... | |
|    for( i = 0; i <= vps_max_layers_minus1; i++ ) | |
|       for( j = 0; j < num_direct_ref_layers[ i ]; j++ ) { | |
|          signal_ref_layer_offsets_flag[ i ][ j ] | u(1) |
|          if( signal_ref_layer_offsets_flag[ i ][ j ] ) { | |
|             scaled_ref_layer_left_offset[ i ][ j ] | ue(v) |
|             scaled_ref_layer_top_offset[ i ][ j ] | ue(v) |
|             scaled_ref_layer_right_offset[ i ][ j ] | ue(v) |
|             scaled_ref_layer_bottom_offset[ i ][ j ] | ue(v) |
|             rel_ref_layer_left_offset[ i ][ j ] | ue(v) |
|             rel_ref_layer_top_offset[ i ][ j ] | ue(v) |
|             rel_ref_layer_right_offset[ i ][ j ] | ue(v) |
|             rel_ref_layer_bottom_offset[ i ][ j ] | ue(v) |
|          } | |
|       } | |
| ... | |
| } | |

In addition, signal_ref_layer_offsets_flag[i][j] equal to 1 means that the scaled reference layer offset syntax elements and the offset syntax elements of the relevant region of reference layer are signaled for the j-th reference layer of layer i. signal_ref_layer_offsets_flag[i][j] equal to 0 means that the scaled reference layer offsets and the offset syntax elements are not signaled for the j-th reference layer of layer i and are all inferred to be equal to 0.

Alternatively, the number of reference layers for which the scaled reference layer offsets would be signaled for each layer i would be signaled and the layer ID of the reference layer would be signaled in addition to identify the layer ID. Table 5 illustrates another example of vps extensions.

TABLE 5

| | Descriptor |
|---|---|
| vps_extension( ) { | |
| ... | |
|    for( i = 0; i <= vps_max_layers_minus1; i++ ) { | |
|       num_ref_layers_with_offsets[ i ] | ue(v) |
|       for(j = 0; j < num_ref_layers_with_offsets[ i ]; j++ ) { | |
|          ref_layer_id[ i ][ j ] | u(v) |
|          scaled_ref_layer_left_offset[ i ][ j ] | ue(v) |
|          scaled_ref_layer_top_offset[ i ][ j ] | ue(v) |
|          scaled_ref_layer_right_offset[ i ][ j ] | ue(v) |
|          scaled_ref_layer_bottom_offset[ i ][ j ] | ue(v) |
|          rel_ref_layer_left_offset[ i ][ j ] | ue(v) |
|          rel_ref_layer_top_offset[ i ][ j ] | ue(v) |
|          rel_ref_layer_right_offset[ i ][ j ] | ue(v) |
|          rel_ref_layer_bottom_offset[ i ][ j ] | ue(v) |
|       } | |
|    } | |
| ... | |
| } | |

In addition, num_ref_layers_with_offsets[i] equals the number of reference layers of layer i for which the scaled reference layer offsets and the relevant region of the reference layer are signaled. The value of num ref layers with offsets[i] will be in the range of 0 to num_direct_ref_layers [i], inclusive.

ref_layer_id[i][j] equals the layer identifier of the reference layer for which the scaled reference layer offsets and the relevant region of the reference layer are signaled in the loop. The number of bits used to represent ref_layer_id[i][j] is Ceil(Log2(num_direct_ref_layers+1)).

To obtain the reference layer picture for the current layer, the derivation process is used once for luma samples with input Z equal to L and once for the chroma samples with input Z equal to C to obtain the variables used in the process. The variables $SubWidth_L$ and $SubHeight_L$ may be both set equal to 1, and the variables $SubWidth_C$ and $SubHeight_C$ may be set equal to SubWidthC and SubHeightC, respectively.

In some embodiments, a variable Z, with possible values L or C, may be input to this process. Let RefPicWidthInLumaSamples[i][j] and RefPicHeightInLumaSamples[i][j] be the width and height, respectively, of the j-th reference layer picture of the i-th layer in units of luma samples as defined in the VPS, for i in the range of 0 to vps_max_layers_minus1, inclusive, and j in the range of 0 to num_direct_ref_layers[i]−1, inclusive. Let CurrPicWidthInLumaSamples[i] and CurrPicHeightInLumaSamples[i] be the width and height, respectively, of the picture of the i-th layer, where i is in the range of 0 to vps_max_layers_minus1, inclusive. The picture widths and heights for the current picture (e.g., the enhancement layer picture) and the reference pictures may be those defined by the syntax elements pic_width_in_luma_samples and pic_height_in_luma_samples for the respective pictures.

The relevant reference layer may be obtained using the relevant reference region offset syntax elements and the corresponding reference layer width and heights. The variables $RelRefLayerPicWidth_Z[i][j]$ and $RelRefLayerPicHeight_Z[i][j]$ may be derived as follows:

$RelRefLayerLeftOffset_Z[ i ][ j ] = rel\_ref\_layer\_left\_offset[ i ][ j ] << (2 - SubWidth_Z)$
$RelRefLayerTopOffset_Z[ i ][ j ] = rel\_ref\_layer\_top\_offset[ i ][ j ] << (2 - SubHeight_Z)$
$RelRefLayerRightOffset_Z[ i ][ j ] = rel\_ref\_layer\_right\_offset[ i ][ j ] << (2 - SubWidth_Z)$
$RelRefLayerBottomOffset_Z[ i ][ j ] = rel\_ref\_layer\_bottom\_offset[ i ][ j ] << (2 - SubHeight_Z)$
$RelRefLayerPicWidth_Z[ i ][ j ] = RefPicWidthInLumaSamples[ i ][ j ] >> ( SubWidth_Z - 1 ) - RelRefLayerLeftOffset_Z[ i ][ j ] - RelRefLayerRightOffset_Z[ i ][ j ]$
$RelRefLayerPicHeight_Z[ i ][ j ] = RefPicHeightInLumaSamples[ i ][ j ] >> ( SubHeight_Z - 1 ) - RelRefLayerTopOffset_Z[ i ][ j ] - RelRefLayerBottomOffset_Z[ i ][ j ]$ The scaled/upsampled region may be obtained by the variables $ScaledRefLayerPicWidth_Z[i][j]$ and $ScaledRefLayerPicHeight_Z[i][j]$, as derived below:

$ScaledRefLayerLeftOffset_Z[ i ][ j ] = scaled\_ref\_layer\_left\_offset[ i ][ j ] << (2 - SubWidth_Z)$
$ScaledRefLayerTopOffset_Z[ i ][ j ] = scaled\_ref\_layer\_top\_offset[ i ][ j ] << (2 - SubHeight_Z)$
$ScaledRefLayerRightOffset_Z[ i ][ j ] = scaled\_ref\_layer\_right\_offset[ i ][ j ] << (2 - SubWidth_Z)$
$ScaledRefLayerBottomOffset_Z[ i ][ j ] = scaled\_ref\_layer\_bottom\_offset[ i ][ j ] << (2 - SubHeight_Z)$
$ScaledRefLayerPicWidth_Z[ i ][ j ] = CurrPicWidthInLumaSamples[ i ] >> ( SubWidth_Z - 1 ) - ScaledRefLayerLeftOffset_Z[ i ][ j ] - ScaledRefLayerRightOffset_Z[ i ][ j ]$
$ScaledRefLayerPicHeight_Z[ i ][ j ] = CurrPicHeightInLumaSamples[ i ] >> ( SubHeight_Z - 1 ) - ScaledRefLayerTopOffset_Z[ i ][ j ] - ScaledRefLayerBottomOffset_Z[ i ][ j ]$ For ease of description of the following decoding process, the terms $LeftStart_Z[i][j]$, $TopStart_Z[i][j]$, $RightEnd_Z[i][j]$ and $BottomEnd_Z[i][j]$ may be defined as follows:

$LeftStart_Z[ i ][ j ] = ScaledRefLayerLeftOffset_Z[ i ][ j ]$
$TopStart_Z[ i ][ j ] = ScaledRefLayerTopOffset_Z[ i ][ j ]$ -continued

```
RightEnd_Z[ i ][ j ] = CurrPicWidthInLumaSamples[ i ] >>
  ( SubWidth_Z - 1 )- ScaledRefLayerRightOffset_Z[ i ][ j ]
BottomEnd_Z[ i ][ j ] = CurrPicHeightInLumaSamples[ i ] >>
  ( SubHeight_Z - 1 )- ScaledRefLayerBottomOffset_Z[ i ][ j ]
```

In some embodiments, the upsampling ratios may be calculated based on the signaled relevant region in reference layer and the upsampled region:

scaleFactorX=(RightEnd$_Z$[i][j]−LeftStart$_Z$[i][j])/(RelRefLayerPicWidth$_Z$[i][j]);

scaleFactorY=(BottomEnd$_Z$[i][j]−TopStart$_Z$[i][j])/(RelRefLayerPicHeight$_Z$[i][j]).

When upsampling the relevant region in the reference layer, the region may be padded for several pixels or extended in a way of using the existing pixels in the reference picture. However, the calculation of the upsampling ratio for each dimension may be decided by the signaled relevant region in the reference layer and the upsampled region in the enhancement layer. Any of a variety of upsampling methods, padding or extending methods can be used together with the techniques and methods described herein.

In some embodiments, the scaled reference layer may be padded before being used as a reference picture for the layer i. The scaled and padded picture of the j-th reference layer of layer i, which may be used for inter-layer prediction for layer i, is denoted by ScaledPaddedRefLayer$_A$[x][y], for A taking values L, Cb or Cr to denote luma samples, Cb samples and Cr samples, respectively. Let RefLayer$_A$[i][j] denote the reference layers samples of the j-th reference layer of layer i corresponding to channel A (luma, Cb or Cr). The relevant region of the reference layer will occupy those samples RefLayer$_A$[x][y] for x in the range of RelRefLayerLeftOffset$_Z$[i][j] to RefPicWidthInLumaSamples[i][j]>>(SubWidth$_Z$−1)−RelRefLayerRightOffset$_Z$[i][j]−1, inclusive, and y in the range of RelRefLayerTopOffset$_Z$[i][j] to RefPicHeightInLumaSamples[i][i]>>(SubHeight$_Z$−1)−RelRefLayerBottomOffset$_Z$[i][i]−1, inclusive. The upsampled picture occupies ScaledPaddedRefLayerA[m][n], for m in the range of LeftStart$_Z$[i][j] to RightEnd$_Z$[i][j]−1, inclusive, and n in the range of TopStart$_Z$[i][j] to BottomEnd$_Z$[i][j]−1, inclusive.

The final ScaledPaddedRefLayer$_A$[x][y] is obtained after the padding operation as described below with input A. After upsampling, the scaled reference layer is further padded in horizontal and/or vertical directions to create an inter-layer reference picture having the same resolution as the current picture (e.g., the enhancement layer picture). A variable A, with possible values L, Cb or Cr, is input to this method. When A equal to L, Z is set equal to L, and when A equal to Cb or Cr, Z is set equal to C. Table 6 illustrates example code that describes a padding operation.

TABLE 6

```
for( x = 0; x < LeftStart_Z[ i ][ j ]; x++ )
  for( y = TopStart_Z[ i ][ j ]; y < BottomEnd_Z[ i ][ j ]; y++ )
    ScaledPaddedRefLayerA[ x ][ y ] =
ScaledPaddedRefLayer_A[ LeftStart_Z[ i ][ j ] ][ y ]
  for( x = RightEnd_Z[ i ][ j ]; x < CurrPicWidthInLumaSamples[ i ][
i ] >> (SubWidth_Z - 1); x++ )
    for( y = TopStart_Z[ i ][ j ]; y < BottomEnd_Z[ i ][ j ]; y++ )
      ScaledPaddedRefLayer_A[ x ][ y ] =
ScaledPaddedRefLayer_A[ RightEnd_Z[ i ][ j ] - 1 ][ y ]
  for( x = 0; x < CurrPicWidthInLumaSamples[ i ][ i ] >>
```

TABLE 6-continued

```
    (SubWidth_Z - 1); x++ )
    for( y = 0; y < TopStart_Z[ i ][ j ]; y++ )
      ScaledPaddedRefLayer_A[ x ][ y ] =
ScaledPaddedRefLayer_A[ x ][ TopStart_Z[ i ][ j ] ]
  for( x = 0; x < CurrPicWidthInLumaSamples[ i ][ i ] >>
    (SubWidth_Z - 1); x++ )
    for( y = BottomEnd_Z[ i ][ j ]; y <
CurrPicHeightInLumaSamples[ i ][ i ] >> (SubHeight_Z - 1); y++ )
      ScaledPaddedRefLayer_A[ x ][ y ] =
ScaledPaddedRefLayer_A[ x ][ BottomEnd_Z[ i ][ j ] - 1 ]
```

Alternately, the padding of the top and the bottom parts of the scaled reference layer picture can be done first followed by the padding of the left and right parts of the scaled reference layer picture. Table 7 provides an example of this padding approach.

TABLE 7

```
for( x = LeftStart_Z[ i ][ j ]; x <RightEnd_Z[ i ][ j ]; x++ )
  for( y = 0; y < TopStart_Z[ i ][ j ]; y++ )
    ScaledPaddedRefLayer_A[ x ][ y ] =
ScaledPaddedRefLayer_A[ x ][ TopStart_Z[ i ][ j ] ]
  for( x = LeftStart_Z[ i ][ j ]; x < RightEnd_Z[ i ][ j ]; x++ )
    for( y = BottomEnd_Z[ i ][ j ]; y <
CurrPicHeightInLumaSamples[ i ][ i ] >> (SubHeight_Z - 1); y++ )
      ScaledPaddedRefLayer_A[ x ][ y ] =
ScaledPaddedRefLayer_A[ x ][ BottomEnd_Z[ i ][ j ] - 1]
  for( x = 0; x < LeftStart_Z[ i ][ j ]; x++ )
    for( y = 0; y < CurrPicHeightInLumaSamples[ i ][ i ] >>
(SubHeight_Z - 1); y++ )
      ScaledPaddedRefLayer_A[ x ][ y ] =
ScaledPaddedRefLayer_A[ LeftStart_Z[ i ][ j ] ][ y ]
  for( x = RightEnd_Z[ i ][ j ]; x < CurrPicWidthInLumaSamples[ i ][
i ] >> (SubWidth_Z - 1); x++ )
    for( y = 0; y < CurrPicHeightInLumaSamples[ i ][ i ] >>
(SubHeight_Z - 1); y++ )
      ScaledPaddedRefLayer_A[ x ][ y ] =
ScaledPaddedRefLayer_A[ RightEnd_Z[ i ][ j ] - 1 ][ y ]
```

Alternatively, all the pixels in the ScaledPaddedRefLayerA[x][y] that are not covered by the scaled reference layer picture may filled by a constant value.

In some embodiments, the entire decoded reference layer picture is upsampled. When the value of any of the scaled reference layer offsets is negative, cropping may be applied on the scaled reference layer such that the boundaries of the picture after cropping are within the decoded picture boundaries of the current picture (e.g., the enhancement layer picture). In this case, the upsampled region may be smaller or larger than the enhancement layer picture.

Syntax elements may be signaled in a video parameter set. Alternatively, such syntax elements can be transmitted in sequence parameter set, or slice header extension, etc. Table 8 provides an example of Video Parameter Set Extension Syntax.

TABLE 8

| | Descriptor |
|---|---|
| vps_extension( ) { | |
| ... | |
|   for( i = 0; i <= vps_max_layers_minus1; i++ ) | |
|     for( j = 0; j < num_direct_ref_layers[ i ]; j++ ) | |
|   { | |
|     scaled_ref_layer_left_offset[ i ][ j ] | se(v) |
|     scaled_ref_layer_top_offset[ i ][ j ] | se(v) |

TABLE 8-continued

| | Descriptor |
|---|---|
| scaled_ref_layer_right_offset[ i ][ j ] | se(v) |
| scaled_ref_layer_bottom_offset[ i ][ j ] | se(v) |
| } | |
| ... | |
| } | |

In some embodiments, the syntax elements scaled_ref_layer_left_offset[i][j], scaled_ref_layer_top_offset[i][j], scaled_ref_layer_right_offset[i][j], scaled_ref_layer_bottom_offset[i][j] specify the distance, in units of two luma samples, of the left, top, right, and bottom boundaries of the scaled decoded reference layer picture from the j-th reference layer of layer i to the left, top, right and bottom boundaries, respectively, of a current picture (e.g., the enhancement layer picture) of layer i that is being decoded. When the scaled reference layer boundary is outside the enhancement layer picture, the distance is specified as a negative number. When not present, the values of these syntax elements are inferred to be equal to 0.

Alternatively, the signaling of the scaled reference layer offset syntax elements may be condition based on a flag, which is also signaled for each reference layer of layer i, similar to the techniques described above. Alternatively, the number of reference layers for layer i for which the scaled reference layer offset syntax elements would be explicitly present is signaled, followed by list of the reference layer ID and the corresponding scaled reference layer offset syntax elements, similar to the techniques described above.

The variables ScaledRefLayerLeftOffset$_Z$[i][j], ScaledRefLayerTopOffset$_Z$[i][j], ScaledRefLayerRightOffset$_Z$[i][j], ScaledRefLayerBottomOffset$_Z$[i][j], ScaledRefLayerPicWidth$_Z$[i][j] and ScaledRefLayerPicHeight$_Z$[i][j] may be derived in the same way as discussed above.

After upsampling the scaled reference layer is further padded or cropped in horizontal or vertical direction to create an inter-layer reference picture having the same resolution as the current picture (e.g., the enhancement layer picture). The scaled reference layer is of size ScaledRefLayerPicWidth$_Z$[i][j] samples in width and ScaledRefLayerPicHeight$_Z$[i][j] samples in height. Let the scaled reference layer j of layer i be ScaledLayer$_A$[x][y] for x in the range of 0 to ScaledRefLayerPicWidth$_Z$[i][j]−1, inclusive and y in the range of 0 to ScaledRefLayerPicHeight$_Z$[i][j]−1, inclusive. This picture may need to be cropped to ensure that the scaled reference picture does extend beyond the boundaries of the current picture (e.g., the enhancement layer picture) of layer i that is being decoded. The variables LeftStart$_Z$[i][j], TopStart$_Z$[i][j], RightEnd$_Z$[i][j] and BottomEnd$_Z$[i][j] may be derived as follows.

```
LeftStart_Z[ i ][ j ] = Max( 0, ScaledRefLayerLeftOffset_Z[ i ][ j ] )
TopStart_Z[ i ][ j ] = Max( 0, ScaledRefLayerTopOffset_Z[ i ][ j ] )
RightEnd_Z[ i ][ j ] = Min( CurrPicWidthInLumaSamples[
      i ] >> ( SubWidth_Z − 1 ),
         CurrPicWidthInLumaSamples[ i ] >> ( SubWidth_Z − 1 )−
ScaledRefLayerRightOffset_Z[ i ][ j ] )
   BottomEnd_Z[ i ][ j ] = Min( CurrPicHeightInLumaSamples[
i ][ >> ( SubHeight_Z − 1 ),
         CurrPicHeightInLumaSamples[ i ][ >> ( SubHeight_Z − 1 )−
ScaledRefLayerBottomOffset_Z[ i ][ j ] )
```

The samples of the scaled reference layer picture that will be obtained after cropping is stored as ScaledPaddedRefLayer$_A$[x][y], and derived as follows. In the following derivation, when A is equal to L (luma), Z equals L and when A is equal to Cb or Cr (chroma), Z equals C.

ScaledPaddedRefLayer$_A$[x][y] may be set equal to ScaledLayer$_A$[x−ScaledRefLayerLeftOffset$_Z$[i][j]][y−ScaledRefLayerTopOffset$_Z$[i][j]], for x in the range of to LeftStart$_Z$[i][j] to RightEnd$_Z$[i][j]−1, inclusive and y in the range of TopStart$_Z$[i][j] to BottomEnd$_Z$[i][j]−1, inclusive. Padding may then be performed on the ScaledPaddedRefLayer$_A$[x][y] as described above. In addition, any combinations of the above embodiments may also be provided.

Figure 12:
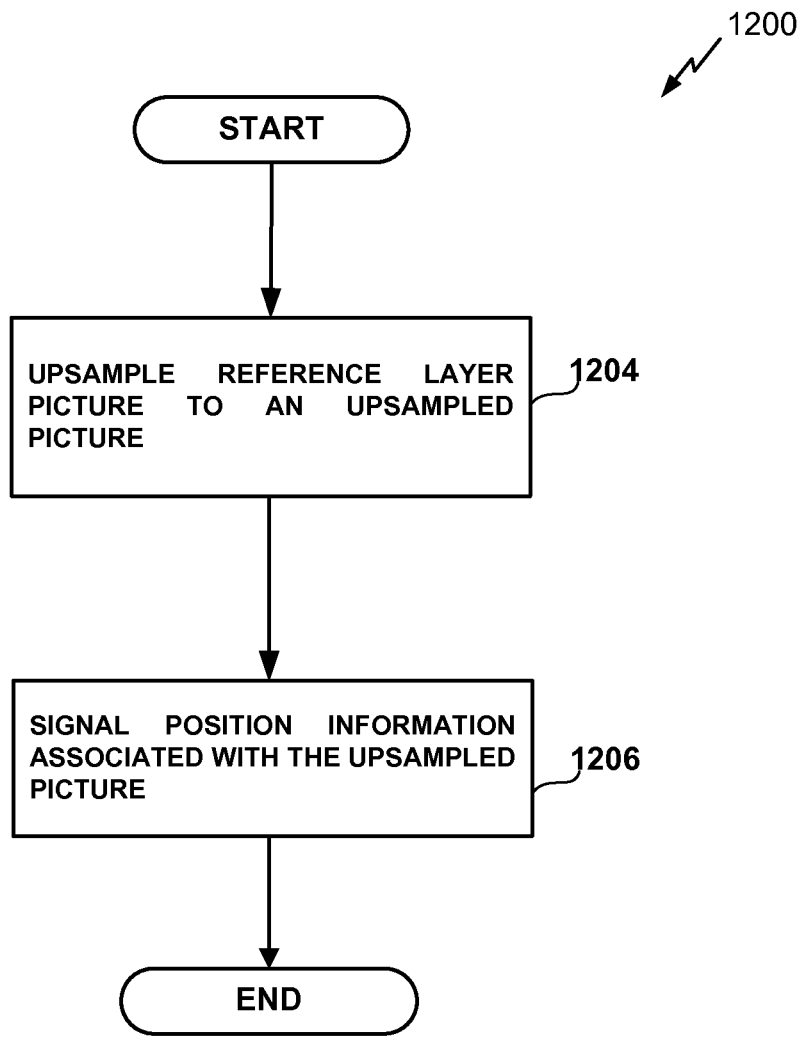
FIG. 12 illustrates a method for coding video data according to an embodiment.

FIG. 12 illustrates an example method 1200 for coding video data according to an example embodiment. The method 1200 can be performed by one or more components of video encoder 20 or video decoder 30, for example. In some embodiments, other components may be used to implement one or more of the steps described herein.

At block 1202, at least a portion of a reference layer picture can be upsampled to an upsampled picture having an upsampled picture size. In some embodiments, the reference layer picture can be obtained or received from video information from a memory. The upsampled picture size can comprise a horizontal upsampled picture size and a vertical upsampled picture size. In some embodiments, at least one of the horizontal or vertical upsampled picture sizes may be different than a horizontal picture size or vertical picture size, respectively, of an enhancement layer picture. For example, at least one of the horizontal or vertical upsampled picture sizes may be smaller than a horizontal picture size or vertical picture size, respectively, of the enhancement layer picture. Alternatively, at least one of the horizontal or vertical upsampled picture sizes may be larger than a horizontal picture size or vertical picture size, respectively, of the enhancement layer picture.

At block 1204, position information associated with the upsampled picture may be signaled. For example, the position information associated with the upsampled picture may be determined based on position information associated with an enhancement layer picture. In some embodiments, the position information associated with the enhancement layer picture includes coordinates of the enhancement layer picture. An inter-layer reference picture may be generated based on the upsampled picture and the position information.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. An apparatus configured to code video information, comprising:
    a processor configured to:
        encode or decode a plurality of reference layer offset values each indicative of a distance of a reference layer (RL) portion of a reference layer picture in a reference layer from a corresponding edge of the reference layer picture, the RL portion corresponding to a portion of the reference layer picture that is to be used to predict at least part of an enhancement layer picture in an enhancement layer;
        determine the RL portion of the reference layer picture in the reference layer using the plurality of reference layer offset values, the RL portion being smaller than the reference layer picture;
        encode or decode enhancement layer offset values each indicative of a distance from corresponding edges of the enhancement layer picture to a first enhancement layer (EL) portion of the enhancement layer picture that is to be predicted based on the reference layer picture, the EL portion of the enhancement layer picture being smaller than the enhancement layer picture;
        determine the first EL portion of the enhancement layer picture that is to be predicted based on the reference layer picture and a second EL portion of the enhancement layer picture that is outside the first EL portion from the enhancement layer offset values, wherein the first EL portion has a horizontal picture size and a vertical picture size;
        upsample the RL portion, the upsampled RL portion having a horizontal upsampled picture size equal to the horizontal picture size of the first EL portion and a vertical upsampled picture size equal to the vertical picture size of the first EL portion; and
        encode or decode the first EL portion based on the upsampled RL portion, wherein the processor is configured to align the upsampled RL portion with the first EL portion and predict samples of the first EL portion from co-located samples of the upsampled RL portion, and encode or decode the second EL portion.

2. The apparatus of claim 1, wherein the plurality of enhancement layer offset values are represented in units of luma samples.

3. The apparatus of claim 1, wherein at least one of the horizontal upsampled picture size or the vertical upsampled picture size is smaller than a horizontal picture size or a vertical picture size, respectively, of the enhancement layer picture.

4. The apparatus of claim 3, wherein the processor is further configured to determine a size difference between a size of the upsampled RL portion and a size of the enhancement layer picture and enlarge the upsampled RL portion based on the size difference.

5. The apparatus of claim 4, wherein the processor is further configured to:
    determine padded pixel values based on values of corresponding nearest boundary pixels in the upsampled RL portion,
    wherein to encode or decode the second EL portion, the processor is configured to predict samples of the second EL portion from co-located padded pixel values of the determined padded pixel values.

6. The apparatus of claim 1, wherein the processor is further configured to determine an upsampling ratio for one or both of a horizontal direction or a vertical direction based at least in part on one or both of a size of the first EL portion and a size of the RL portion.

7. The apparatus of claim 1, wherein the apparatus comprises a video encoder.

8. The apparatus of claim 1, wherein the processor is further configured to generate an inter-layer reference picture based on the upsampled RL portion.

9. The apparatus of claim 1, the apparatus further comprising at least one of a digital television, digital direct broadcast system, wireless broadcast system, personal digital assistant (PDA), laptop or desktop computer, digital camera, digital recording device, digital media player, video gaming device, video game console, cellular or satellite radio telephone, or video teleconferencing device that comprises the memory and the processor.

10. A method of coding video data, the method comprising:
   encoding or decoding a plurality of reference layer offset values each indicative of a distance of a reference layer (RL) portion of a reference layer picture in a reference layer from a corresponding edge of the reference layer picture, the RL portion corresponding to a portion of the reference layer picture that is to be used to predict at least part of an enhancement layer picture in an enhancement layer;
   determining the RL portion of the reference layer picture in the reference layer using the plurality of reference layer offset values, the RL portion being smaller than the reference layer picture;
   encoding or decoding enhancement layer offset values each indicative of a distance from corresponding edges of the enhancement layer picture to a first enhancement layer (EL) portion of the enhancement layer picture that is to be predicted based on the reference layer picture, the EL portion of the enhancement layer picture being smaller than the enhancement layer picture;
   determining the first EL portion of the enhancement layer picture that is to be predicted based on the reference layer picture and a second EL portion of the enhancement layer picture that is outside the first EL portion from the enhancement layer offset values, wherein the first EL portion has a horizontal picture size and a vertical picture size;
   upsampling the RL portion, the upsampled RL portion having a horizontal upsampled picture size equal to the horizontal picture size of the first EL portion and a vertical upsampled picture size equal to the vertical picture size of the first EL portion; and
   encoding or decoding the first EL portion based on the upsampled RL portion, comprising aligning the upsampled RL portion with the first EL portion and predicting samples of the first EL portion from co-located samples of the upsampled RL portion, and encoding or decoding the second EL portion.

11. The method of claim 10, wherein the plurality of enhancement layer offset values are represented in units of luma samples.

12. The method of claim 10, wherein at least one of the horizontal upsampled picture size or the vertical upsampled picture size is smaller than a horizontal picture size or a vertical picture size, respectively, of the enhancement layer picture.

13. The method of claim 12, further comprising determining a size difference between a size of the upsampled RL portion and a size of the enhancement layer picture and enlarging the upsampled RL portion based on the size difference.

14. The method of claim 13, further comprising:
   determining padded pixel values based on values of corresponding nearest boundary pixels in the upsampled RL portion,
   wherein encoding or decoding the second EL portion comprises predicting samples of the second EL portion from co-located padded pixel values of the determined padded pixel values.

15. The method of claim 10, further comprising determining an upsampling ratio for one or both of a horizontal direction or a vertical direction based at least in part on one or both of a size of the first EL portion and a size of the RL portion.

16. The method of claim 10, further comprising generating an inter-layer reference picture based on the upsampled RL portion.

17. An apparatus for processing video information, the apparatus comprising:
   means for encoding or decoding a plurality of reference layer offset values each indicative of a distance of a reference layer (RL) portion of a reference layer picture in a reference layer from a corresponding edge of the reference layer picture, the RL portion corresponding to a portion of the reference layer picture that is to be used to predict at least part of an enhancement layer picture in an enhancement layer;
   means for determining the RL portion of the reference layer picture in the reference layer using the plurality of reference layer offset values, the RL portion being smaller than the reference layer picture;
   means for encoding or decoding enhancement layer offset values each indicative of a distance from corresponding edges of the enhancement layer picture to a first enhancement layer (EL) portion of the enhancement layer picture that is to be predicted based on the reference layer picture, the EL portion of the enhancement layer picture being smaller than the enhancement layer picture;
   means for determining the first EL portion of the enhancement layer picture that is to be predicted based on the reference layer picture and a second EL portion of the enhancement layer picture that is outside the first EL portion from the enhancement layer offset values, wherein the first EL portion has a horizontal picture size and a vertical picture size;
   means for upsampling the RL portion, the upsampled RL portion having a horizontal upsampled picture size equal to the horizontal picture size of the first EL portion and a vertical upsampled picture size equal to the vertical picture size of the first EL portion; and
   means for encoding or decoding the first EL portion based on the upsampled RL portion, comprising means for aligning the upsampled RL portion with the first EL portion and means for predicting samples of the first EL portion from co-located samples of the upsampled RL portion, and means for encoding or decoding the second EL portion.

18. The apparatus of claim 17, wherein the plurality of enhancement layer offset values are represented in units of luma.

19. The apparatus of claim 17, further comprising means for determining a size difference between a size of the upsampled RL portion and a size of the enhancement layer picture and enlarging the upsampled RL portion based on the size difference.

20. A non-transitory computer-readable medium having stored thereon instructions that, when executed by a processor, cause the processor to:
   encode or decode a plurality of reference layer offset values each indicative of a distance of a reference layer (RL) portion of a reference layer picture in a reference layer from a corresponding edge of the reference layer picture, the RL portion corresponding to a portion of the reference layer picture that is to be used to predict at least part of an enhancement layer picture in an enhancement layer;

determine the RL portion of the reference layer picture in the reference layer using the plurality of reference layer offset values, the RL portion being smaller than the reference layer picture;

encode or decode enhancement layer offset values each indicative of a distance from corresponding edges of the enhancement layer picture to a first enhancement layer (EL) portion of the enhancement layer picture that is to be predicted based on the reference layer picture;

determine the first EL portion of the enhancement layer picture that is to be predicted based on the reference layer picture and a second EL portion of the enhancement layer picture that is outside the first EL portion from the enhancement layer offset values, wherein the first EL portion has a horizontal picture size and a vertical picture size;

upsample the RL portion, the upsampled RL portion having a horizontal upsampled picture size equal to the horizontal picture size of the first EL portion and a vertical upsampled picture size equal to the vertical picture size of the first EL portion; and encode or decode the first EL portion based on the upsampled RL portion, comprising instructions that cause the processor to align the upsampled RL portion with the first EL portion and predict samples of the first EL portion from co-located samples of the upsampled RL portion, and encode or decode the second EL portion.

21. The non-transitory computer-readable medium of claim 20, wherein the plurality of enhancement layer offset values are represented in units of luma samples.

22. The non-transitory computer-readable medium of claim 20, wherein the instructions further cause the processor to determine a size difference between a size of the upsampled RL portion and a size of the enhancement layer picture and enlarge the upsampled RL portion based on the size difference.

23. The apparatus of claim 1, wherein the processor is further configured to, in addition to encoding or decoding the plurality of enhancement layer offset values corresponding to the plurality of reference layer offset values, encode or decode one or more additional sets of enhancement layer offset values that each correspond to a different portion of the enhancement layer picture.

24. The method of claim 10, further comprising, in addition to encoding or decoding the plurality of enhancement layer offset values corresponding to the plurality of reference layer offset values, encoding or decoding one or more additional sets of enhancement layer offset values that each correspond to a different portion of the enhancement layer picture.

25. The apparatus of claim 23, wherein the processor is further configured to, in addition to encoding or decoding the plurality of reference layer offset values corresponding to the plurality of enhancement layer offset values, encode or decode one or more additional sets of reference layer offset values that each correspond to a different one of a plurality of reference layers used to predict the enhancement layer picture.

26. The method of claim 24, further comprising, in addition to encoding or decoding the plurality of reference layer offset values corresponding to the plurality of enhancement layer offset values, encoding or decoding one or more additional sets of reference layer offset values that each correspond to a different one of a plurality of reference layers used to predict the enhancement layer picture.

* * * * *